United States Patent
Burt

(10) Patent No.: US 10,007,239 B2
(45) Date of Patent: Jun. 26, 2018

(54) ADVANCED VALVE ACTUATOR WITH INTEGRAL ENERGY METERING

(71) Applicant: SCHNEIDER ELECTRIC BUILDINGS, LLC, Rockford, IL (US)

(72) Inventor: Alan Burt, Rockford, IL (US)

(73) Assignee: Schneider Electric Buildings LLC, Rockford, IL (US)

( * ) Notice: Subject to any disclaimer, the term of this patent is extended or adjusted under 35 U.S.C. 154(b) by 374 days.

(21) Appl. No.: 14/208,118

(22) Filed: Mar. 13, 2014

(65) Prior Publication Data

US 2014/0277764 A1 Sep. 18, 2014

Related U.S. Application Data

(60) Provisional application No. 61/790,696, filed on Mar. 15, 2013.

(51) Int. Cl.
| | |
|---|---|
| G05D 23/00 | (2006.01) |
| E03B 1/00 | (2006.01) |
| G05D 13/10 | (2006.01) |
| G05D 11/00 | (2006.01) |
| B67D 7/72 | (2010.01) |
| B01D 19/00 | (2006.01) |
| G05B 15/02 | (2006.01) |
| F24F 11/30 | (2018.01) |
| F24F 110/10 | (2018.01) |
| F24F 140/12 | (2018.01) |
| F24F 11/84 | (2018.01) |

(52) U.S. Cl.
CPC .............. *G05B 15/02* (2013.01); *F24F 11/30* (2018.01); *F24F 11/84* (2018.01); *F24F 2110/10* (2018.01); *F24F 2140/12* (2018.01)

(58) Field of Classification Search
CPC .................. G05B 15/02; F24F 11/0012; F24F 2011/0043; F24F 2011/0082; F24F 11/30; F24F 11/84; F24F 2140/12; F24F 2110/10
USPC ........... 137/2, 55, 101.21, 118.02, 166, 174; 700/276
See application file for complete search history.

(56) References Cited

U.S. PATENT DOCUMENTS

| | | | |
|---|---|---|---|
| 1,558,276 A | 10/1925 | Peterson | |
| 1,820,473 A | 8/1931 | Milone | |

(Continued)

FOREIGN PATENT DOCUMENTS

| | | |
|---|---|---|
| CN | 1044978 A | 8/1990 |
| CN | 101003253 A | 7/2007 |

(Continued)

OTHER PUBLICATIONS

U.S. Appl. No. 13/710,709, filed Dec. 11, 2012, Burt et al.

(Continued)

*Primary Examiner* — Thomas C Lee
*Assistant Examiner* — Thomas H Stevens
(74) *Attorney, Agent, or Firm* — Locke Lord LLP

(57) ABSTRACT

An automatic control valve actuator assembly is configured to control opening and closing of the valve via positioning of a valve closure member. The valve actuator is further configured to determine the volume of fluid flowing through the valve. In an embodiment, the valve actuator includes an integral energy consumption calculation and retention module configured to calculate heat energy for energy consumption tracking.

21 Claims, 10 Drawing Sheets

(56) References Cited

U.S. PATENT DOCUMENTS

| | | |
|---|---|---|
| 3,369,556 A | 2/1968 | Allderdice |
| 3,636,765 A | 1/1972 | Brown |
| 3,761,196 A | 9/1973 | Weinert |
| 3,880,399 A | 4/1975 | Luthe |
| 4,028,689 A | 6/1977 | Schopp |
| 4,036,051 A | 7/1977 | Fell et al. |
| 4,066,090 A | 1/1978 | Nakajima et al. |
| 4,108,210 A | 8/1978 | Luthe et al. |
| 4,149,563 A | 4/1979 | Seger |
| 4,224,825 A | 9/1980 | Feller |
| 4,245,501 A | 1/1981 | Feller |
| 4,250,747 A | 2/1981 | Diprose et al. |
| 4,286,613 A | 9/1981 | Lacoste |
| 4,333,354 A | 6/1982 | Feller |
| 4,388,003 A | 6/1983 | Feller |
| 4,393,919 A | 7/1983 | Anderson |
| 4,403,871 A | 9/1983 | Feller |
| 4,412,647 A | 11/1983 | Lampert |
| 4,415,279 A | 11/1983 | Beuse et al. |
| 4,469,118 A | 9/1984 | Walters |
| 4,473,307 A | 9/1984 | Dobronyi et al. |
| 4,482,006 A | 11/1984 | Anderson |
| 4,567,915 A | 2/1986 | Bates et al. |
| 4,604,976 A * | 8/1986 | Sturdy ............... F02D 11/10 |
| | | 123/352 |
| 4,635,668 A | 1/1987 | Netter |
| 4,650,155 A | 3/1987 | Liantonio |
| 4,657,038 A | 4/1987 | Lyons |
| 4,679,592 A | 7/1987 | Lamb |
| 4,694,390 A | 9/1987 | Lee |
| 4,739,794 A | 4/1988 | Ballun |
| 4,848,389 A | 7/1989 | Pirkle |
| 4,860,993 A | 8/1989 | Goode |
| 4,909,076 A | 3/1990 | Busch et al. |
| 5,018,703 A | 5/1991 | Goode |
| 5,090,436 A | 2/1992 | Hoch, Jr. et al. |
| 5,113,892 A | 5/1992 | Hull et al. |
| 5,168,200 A * | 12/1992 | Payne ............... G01F 1/26 |
| | | 251/129.11 |
| 5,220,937 A | 6/1993 | Roberts et al. |
| 5,402,822 A | 4/1995 | Brouwer et al. |
| 5,428,994 A | 7/1995 | Wenzel et al. |
| 5,553,505 A | 9/1996 | Bignell et al. |
| 5,573,032 A | 11/1996 | Lenz et al. |
| 5,643,482 A | 7/1997 | Sandelman et al. |
| 5,692,535 A | 12/1997 | Walters |
| 5,758,684 A | 6/1998 | Hudson et al. |
| 5,775,369 A | 7/1998 | Hagmann |
| 6,012,294 A | 1/2000 | Utsumi |
| 6,039,304 A | 3/2000 | Carlson et al. |
| 6,056,008 A | 5/2000 | Adams et al. |
| 6,125,873 A | 10/2000 | Brown |
| 6,155,283 A | 12/2000 | Hansen et al. |
| 6,161,764 A | 12/2000 | Jatnieks |
| 6,178,996 B1 | 1/2001 | Suzuki |
| 6,352,106 B1 | 3/2002 | Hartman |
| 6,471,182 B1 | 10/2002 | McIntosh |
| 6,505,991 B2 | 1/2003 | Roman |
| 6,534,942 B2 | 3/2003 | Schmidhuber |
| 6,612,331 B2 | 9/2003 | Cederstav et al. |
| 6,622,930 B2 | 9/2003 | Laing et al. |
| 6,663,349 B1 | 12/2003 | Discenzo et al. |
| 6,725,167 B2 | 4/2004 | Grumstrup et al. |
| 6,814,096 B2 | 11/2004 | Vyers et al. |
| 6,820,631 B2 | 11/2004 | Lehnst et al. |
| 6,827,100 B1 | 12/2004 | Carlson |
| 6,837,480 B1 | 1/2005 | Carlson |
| 6,859,740 B2 | 2/2005 | Stephenson et al. |
| 6,889,559 B2 | 5/2005 | Gimson |
| 6,954,683 B2 | 10/2005 | Junk et al. |
| 7,025,328 B2 | 4/2006 | Ulicny et al. |
| 7,096,093 B1 | 8/2006 | Hansen et al. |
| 7,104,461 B2 | 9/2006 | Restivo, Sr. et al. |
| 7,152,628 B2 | 12/2006 | Folk et al. |
| 7,166,981 B2 | 1/2007 | Kakutani et al. |
| 7,178,783 B2 | 2/2007 | Tuin et al. |
| 7,191,678 B2 | 3/2007 | Schnuke et al. |
| RE39,658 E | 5/2007 | Carlson et al. |
| 7,228,869 B2 | 6/2007 | Wilhelm |
| 7,231,931 B2 | 6/2007 | Lull et al. |
| 7,246,941 B2 | 7/2007 | Shike |
| 7,266,427 B2 | 9/2007 | Hansen et al. |
| 7,434,477 B2 | 10/2008 | Lull et al. |
| 7,436,312 B2 | 10/2008 | Schultz |
| 7,451,781 B2 | 11/2008 | Carlson |
| 7,637,723 B2 | 12/2009 | Sadasivam |
| 7,691,652 B2 | 4/2010 | Van Der Wiel |
| 7,734,572 B2 | 6/2010 | Wiemeyer et al. |
| 7,797,080 B2 | 9/2010 | Durham, III |
| 7,798,170 B2 | 9/2010 | Hotz et al. |
| 8,365,762 B1 * | 2/2013 | Trotter ............... B64D 1/18 |
| | | 137/485 |
| 2001/0030309 A1 | 10/2001 | Carlson et al. |
| 2002/0123856 A1 | 9/2002 | Eryurek |
| 2003/0080703 A1 | 5/2003 | Elliott et al. |
| 2003/0213246 A1 * | 11/2003 | Coll ............... F01K 17/02 |
| | | 60/653 |
| 2004/0173261 A1 | 9/2004 | Stoffers |
| 2005/0039797 A1 | 2/2005 | Carlson |
| 2006/0037646 A1 | 2/2006 | Wilhelm |
| 2006/0234414 A1 | 10/2006 | Van Der Wiel |
| 2006/0260698 A1 | 11/2006 | Bailey et al. |
| 2007/0012367 A1 | 1/2007 | Hotz et al. |
| 2007/0168086 A1 * | 7/2007 | Schultz ............... G08B 25/045 |
| | | 700/282 |
| 2008/0164006 A1 * | 7/2008 | Karamanos ............ F24F 1/0059 |
| | | 165/67 |
| 2008/0173439 A1 * | 7/2008 | Ashe ............... G05D 23/1919 |
| | | 165/299 |
| 2008/0173838 A1 | 7/2008 | Schmidig et al. |
| 2008/0307879 A1 | 12/2008 | Borst et al. |
| 2009/0009115 A1 | 1/2009 | Grogg et al. |
| 2009/0171512 A1 | 7/2009 | Duncan |
| 2009/0260488 A1 | 10/2009 | Kanazawa et al. |
| 2010/0107755 A1 | 5/2010 | Van Der Weil |
| 2010/0142535 A1 | 6/2010 | Swainston |
| 2010/0155635 A1 | 6/2010 | Fima |
| 2010/0251742 A1 | 10/2010 | Tucker et al. |
| 2011/0153089 A1 | 6/2011 | Tiemann et al. |
| 2012/0076080 A1 * | 3/2012 | Reuss ............... H04R 5/033 |
| | | 370/328 |
| 2012/0161562 A1 | 6/2012 | Windgassen |
| 2012/0185102 A1 | 7/2012 | Skoglund et al. |
| 2012/0285152 A1 * | 11/2012 | Sugano ............... B66D 1/44 |
| | | 60/325 |
| 2012/0298224 A1 | 11/2012 | Imanari et al. |
| 2014/0034145 A1 | 2/2014 | Burt |
| 2014/0097367 A1 | 4/2014 | Burt |
| 2014/0343734 A1 * | 11/2014 | Meyer ............... G05B 15/02 |
| | | 700/282 |
| 2015/0075148 A1 * | 3/2015 | Yamaji ............... F04B 49/06 |
| | | 60/420 |

FOREIGN PATENT DOCUMENTS

| | | |
|---|---|---|
| CN | 201420890 Y | 3/2010 |
| CN | 101696817 A | 4/2010 |
| CN | 202002262 U | 10/2011 |
| CN | 102777982 A | 11/2012 |
| JP | H0658598 A | 3/1994 |
| JP | H06300397 A | 10/1994 |
| JP | 2001271962 A | 10/2001 |
| JP | 2003322395 A | 11/2003 |
| JP | 2004028476 A | 1/2004 |
| WO | WO 99/54987 A1 | 10/1999 |
| WO | WO 2006/088286 A1 | 8/2006 |

(56) References Cited

FOREIGN PATENT DOCUMENTS

| WO | WO 2012/065275 | 5/2012 |
| WO | WO 2012/087659 A2 | 6/2012 |

OTHER PUBLICATIONS

Knowledge is Power—The Belimo Energy Valve™; brochure; known prior to Aug. 6, 2012; 4 pages; Belimo Americas, Danbury, CT.
Knowledge is Power—Belimo Energy Valve™; presentation; known prior to Aug. 6, 2012; 45 pages.

* cited by examiner

| OSI Model Set | OSI Model Layer | Addressing | OSI Model Layer Protocol Data Unit (PDU) | TCP/IP Model Layer | Function | Execution | Protocol | New Art Layer Usage |
|---|---|---|---|---|---|---|---|---|
| Application Set | Application (7) | - | Data | Application | User Interface | | Software, FTP, HTTP Web Browser, SMTP | Yes |
| | Presentation (6) | - | Data | | Presentation of Data | | Software, ASCII, GIF, BMP, PEG, PNG | |
| | Session (5) | - | Data | | Communications Synchronization | | Software | |
| Transport Set | Transport (4) | Must identify the destination process | Segment/Datagram * | Transport | Data Control and Error Checking | Software | Hardware/Software, TCP | |
| | Network (3) | Must include information to enable routing | Packet | Internet | Router Addressing | | Hardware/Software, IP | Yes |
| | Data Link (2) | Must be able to select any entity on the network | Frame | Link | Data Destination and Coordination | Hardware and Software | Hardware/Software (Ethernet IEEE802.2) | Yes |
| | Physical (1) | None | Bits | | Physical Network Processing | | BACnet, Modbus, LONtalk, KNX | Yes |

*=Segment for TCP, datagram for UDP

FIG. 2

| OSI Model Layer | | Protocol | BACnet | KNX | LonWorks | M-Bus | Mod Bus | Wireless - EnOcean | Wireless - Zigbee |
|---|---|---|---|---|---|---|---|---|---|
| Layer | | Application (7) | X | X | X | X | X | X | X |
| | | Presentation (6) | | | | | | | |
| | | Session (5) | | | | | | | |
| | | Transport (4) | | | | | | | |
| | | Network (3) | X | X | X | | | X | X |
| | | Data Link (2) | X | X | X | X | X | X | X |
| | | Physical (1) | X | X | X | X | X | X | X |
| Communtications | | | | | | | | | |
| Data Package | | BACnet, Objects | X | | | | | | |
| | | Data Structures, Data Types, Actions, ENL 1434-3 | | | | X | | | |
| | | EIS Standards, EIB Variables | | X | | | | | |
| | | EnOcean Equipment Application Profiles EEP | | | | | | X | |
| | | Manufactured Defined Application Objects | | | | | | | X |
| | | Protocol Data Unit, Application Data Unit | | | | | X | | |
| | | Standard Network Variable Types (SNVT) | | | X | | | | |
| Medium | | | | | | | | | |
| Medium Type | | Ethernet | | | | | | | |
| | | IP/Ethernet | X | E | D | | A | | |
| | | Twisted Pair EIA 485 | F | | | | B | | |
| | | Twisted Pair FTT-10 | | | C | | | | |
| | | Twisted Pari TP1-256 | | X | | | | | |
| | | Wireless, 315 Mhz, 868.3 Mhz | | | | | | X | |
| | | Wireless 868 Mhz, 915 Mhz 2.4 Ghz | | | | | | | X |

A — ModBus TCP
B — ModBus RTU
C — LonWorks
D — LonWorks over Ethernet
E — KNXnet/IP
F — Master-Slave/Token Passing (MS/TP)

FIG. 3

ADVANCED VALVE ACTUATOR WITH INTEGRAL ENERGY METERING

CROSS-REFERENCE TO RELATED PATENT APPLICATION

This patent application claims the benefit of U.S. Provisional Patent Application No. 61/790,696, filed Mar. 15, 2013, the entire teachings and disclosure of which are incorporated herein by reference thereto.

FIELD OF THE INVENTION

This invention generally relates to valves and valve actuators and flow and energy meters, and more particularly, to valves and valve actuators and flow and energy meters configured to be controlled electronically with communications capability.

BACKGROUND OF THE INVENTION

Many types of commercial and industrial systems involve processes in which liquids are supplied via fluid control systems that may include a variety of both pumping assemblies and control valves. These fluid control systems include, but are not limited to, those used in electrical power stations, chemical manufacturing operations, food and beverage processing, liquid gas supply and disposal, water supply and disposal, heating, ventilation, and air conditioning (HVAC) systems, etc. These commercial and industrial systems, to realize any capability to monitor and track energy usage, it is necessary to acquire and install a plurality of separate components to the control valve assembly. However, this tends to make efforts to monitor and manage energy consumption both costly and time-consuming.

Automatic control valves are used to control temperature, humidity, or pressure in fluid heating or cooling systems by restricting the flow of a fluid by means of positioning a valve closure member. The automatic control valve operates in response from an external or internal controller or thermostat, and often is used is used with other devices to calculate and indicate the volume of fluid passed and energy consumed by the fluid system and interface with the process control or Building Management System (BMS). A building management system implemented using a communications network is disclosed in U.S. Patent Publication No. 2010/0142535, the teachings and disclosure of which is incorporated herein by reference thereto.

Embodiments of the present invention represent an advancement over the state of the art with respect to process control and HVAC systems and the control thereof. These and other advantages of the invention, as well as additional inventive features, will be apparent from the description of the invention provided herein.

BRIEF SUMMARY OF THE INVENTION

In one aspect, embodiments of the invention provide an automatic control valve and actuator assembly that includes a valve configured to control a flow of fluid into a heat exchanger load or HVAC coil, and a valve actuator configured to control opening and closing of a self-actuated pressure-independent valve with an internal mechanical flow control mechanism via positioning of a valve closure member. In an embodiment, the valve actuator includes an integral fluid flow and energy consumption calculation and retention module configured to calculate heat energy for energy consumption tracking.

In certain embodiments, the energy consumption calculation and retention module calculates heat energy for energy consumption tracking using data from a valve flow rate meter that calculates a flow rate of liquid through the valve. It also uses data from fluid temperature sensors that measures the temperature differential across the coil or load to provide calculation of energy.

In other embodiments, the valve actuator has a communications module configured to facilitate communication with the valve actuator over a network, and further configured to allow both remote monitoring of the fluid flow through the valve, and remote control of the valve actuator. The energy consumption calculation and retention module may be coupled to the communications module such that data from the energy consumption calculation and retention module can be accessed both locally and remotely.

In a further embodiment, the valve actuator is configured to electronically provide pressure independent valve functionality while connected to a mechanical pressure-dependent valve body. In yet a further embodiment the valve actuator is configured to produce an automatic minimum flow through the valve to prevent freezing of the fluid in the HVAC coil or heat exchanger, and wherein data from the energy consumption calculation and retention module is used to operate the valve actuator such that any chillers and boilers coupled to the HVAC valve and actuator assembly operate at their most efficient temperature differential.

In some embodiments, the valve actuator has a plurality of adjustable operating parameters, and the plurality of adjustable operating parameters can be adjusted either locally or remotely. The valve actuator may further comprise a diagnostics module configured to provide diagnostic information on operation of the valve and actuator assembly to a remote location, wherein the diagnostics module provides diagnostic information regarding energy consumption data provided by the energy consumption calculation and retention module.

In a particular embodiment, the valve actuator has a motor and geartrain coupled to the throttling valve closure member by a direct connected or spring loaded linkage assembly, and a circuit board having control circuitry to regulate operation of the motor and geartrain, and communications circuitry to enable the actuator to communicate with a building management system via a serial communications bus. The valve actuator may also be configured to operate the mechanical pressure-dependent valve body as either a pressure-independent valve or a pressure-dependent valve.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 2 is a juxtaposition of the Open System Interconnection and TCP/IP conceptual networking models;

FIG. 3 is a an overview of the art protocols, layers, and connection mediums;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
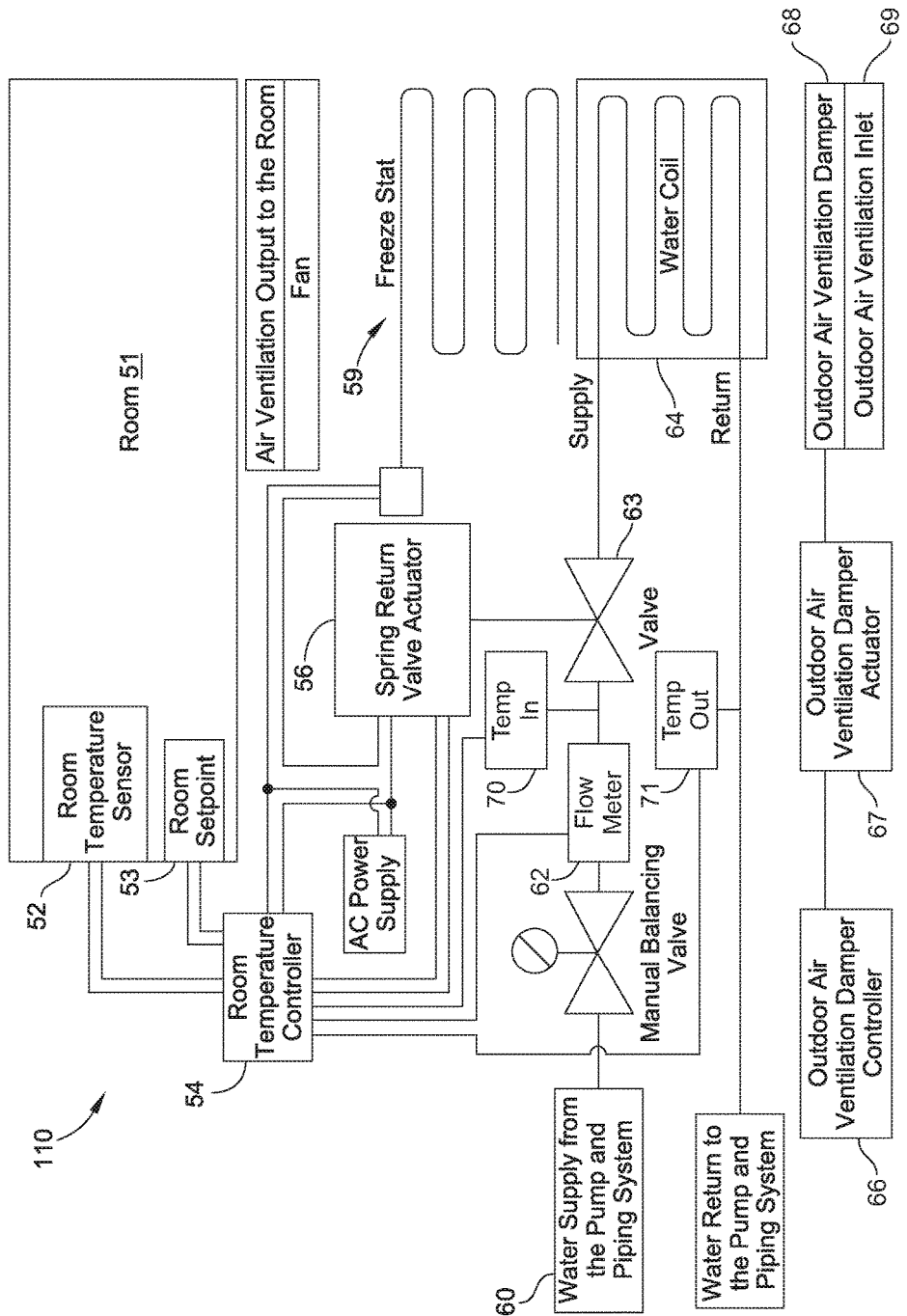
FIG. 1 is a schematic diagram of a prior art HVAC valve configuration with fluid and energy monitoring.

FIG. 1 is a schematic diagram showing a conventional HVAC system 110 that requires multiple devices to obtain the required water valve control and fluid flow and energy consumption calculation. The source of the hot and cold water for the water supply from the pump and piping system 60 is generally located outside of the room 51, and is usually a centralized supply consisting of one or more boilers or chillers (not shown) that can be alternately connected within the source. The valve 63 modulates the flow of hot and cold water from the water supply from the pump and piping system 60 for heating and/or cooling of the room 51. Typically, the valve 63 is mechanically driven by the spring return valve actuator 56 that is operatively connected in accordance with the control signal provided by the room temperature controller 54.

In typical embodiments, the room temperature controller 54 receives a temperature sensing signal from the room temperature sensor 52 and compares it to the desired room temperature setpoint that is provided by the room setpoint device 53, which can be a potentiometer or keypad, for example. The flow meter 62 can optionally be used by the room temperature controller 54 to provide flow information for indication purposes, for optional flow volume control rather than by conventional temperature control, or for energy calculation with the use of the temp in 70 and temp out 71 sensors to determine the temperature change across the water coil 64 or load.

In the embodiment shown, the spring return valve actuator 56 operates from a proportional control signal received from the room temperature controller 54 to manually position the valve 63 from full closed to full open to maintain the desired room setpoint as provided by the room setpoint device 53. The room 51 air temperature is controlled by having air pass through a water coil 64 with an appropriate volume of hot or cold water to provide the necessary temperature differential between the water coil 64 temperature and the room 51 temperature to drive the room 51 temperature toward the desired room setpoint device 53. The water coil 64 uses hot or cold water that is provided by the central boiler and chiller system, for example, delivered by the water supply from the pump and piping system 60. Generally, each room has its own piping system. When it is desired to operate the systems in the heating mode, the water supply from the pump and piping system 60 provides hot water, from a boiler for example, and when it is desired to operate the system in the cooling mode, the water supply from the pump and piping system 60 provides cold water, from a chiller for example.

The outdoor air ventilation inlet 69 and outdoor air ventilation damper 68 are used to provide fresh air to the room. The volume of fresh air is controlled by the outdoor air ventilation damper controller 66 which mechanically positions the outdoor air ventilation damper actuator 67. There are a number of damper actuator control methods that are commonly used. With all methods there is a risk that cold outdoor air can freeze the water in the water coil 64 and cause significant property damage. Common outdoor air damper issues include damper blades that do not close tightly due to wear, warping, or other damage, loose or damaged mechanical linkages, and actuator failure.

Not surprisingly, the probability of a coil freeze condition is most likely to occur in the heating mode because the outdoor air temperature is cold. For water in the water coil 64 to freeze, there water therein must be somewhat stationary and exposed to cold temperatures for a period of time sufficient to lower the water temperature below 32° F. (0° C.). When the outdoor air temperature is very cold, the room temperature is likely to be cold and the valve at least partially open, which can reduce the possibility of a water coil freeze condition. With milder outdoor air temperatures that are below 32° F. (0° C.) but not cold enough to necessarily cause the room 51 temperature to be uncomfortably cold, there can be a significant risk of water in the water coil 64 freezing, since the valve 63 may be closed because the room 51 does not require heat such that the water in the water coil 64, 82 is not flowing, thus giving rise to a potential freeze condition.

With the conventional HVAC system 110 shown in FIG. 1, a freeze stat 59 is wired in series with the spring return valve actuator 56. When the freeze stat 59 detects a potential freeze condition, it will discontinue power to the spring return valve actuator 56, which, in some instances, has an internal spring mechanism to drive it to a known position upon loss of power. It is often the case that this known position is the fully open valve position, such that the valve 63 protects the water coil 64 and piping system from freezing, even if a lower volume of flow would be adequate to prevent the freeze condition. This approach tends to waste energy. In some cases, the freeze stat 59 may also provide power to the outdoor air ventilation damper actuator 67, which may also have spring return operation to close off the outdoor air ventilation damper 68 if the freeze stat 59 detects a potential freeze condition.

An alternate approach to achieving freeze protection in HVAC coils 64 in closed loops is the addition of an anti-freeze to prevent the rigid pipes and coils from undergoing physical stresses, deformation, and rupture due to the expansion that occurs when water turns to ice. Compounds are added to the water to reduce the freezing point of the mixture below the lowest temperature the system is likely encounter. The most frequently used antifreeze compounds for HVAC closed loop systems are ethylene glycol and propylene glycol. One of the most important characteristics of glycol is its viscosity because of its influence on the ease of pumping and its impact on heat transfer. Viscosities of glycols vary inversely with temperature. Hot glycols flow freely, but their viscosities increase as they cool until they eventually set and no longer flow. Glycol water mixtures are more viscous than water alone and their viscosities become greater as the glycol content is increased, or if the water mixture temperature is lowered.

In other embodiments of FIG. 1 used in commercial and industrial systems, certain components may not be necessary or may be of alternate functionality for the application. Systems for process cooling or heating may not require the outdoor air intake functionality provided by the outdoor air ventilation controller 66, outdoor air ventilation damper actuator 67, outdoor air ventilation damper 68, and outdoor air ventilation inlet 69. The spring return valve actuator 56 may be of a design without a spring return function allowing it to remain in place upon loss of power for applications where there is no probability of a fluid freeze condition.

Figure 5A:
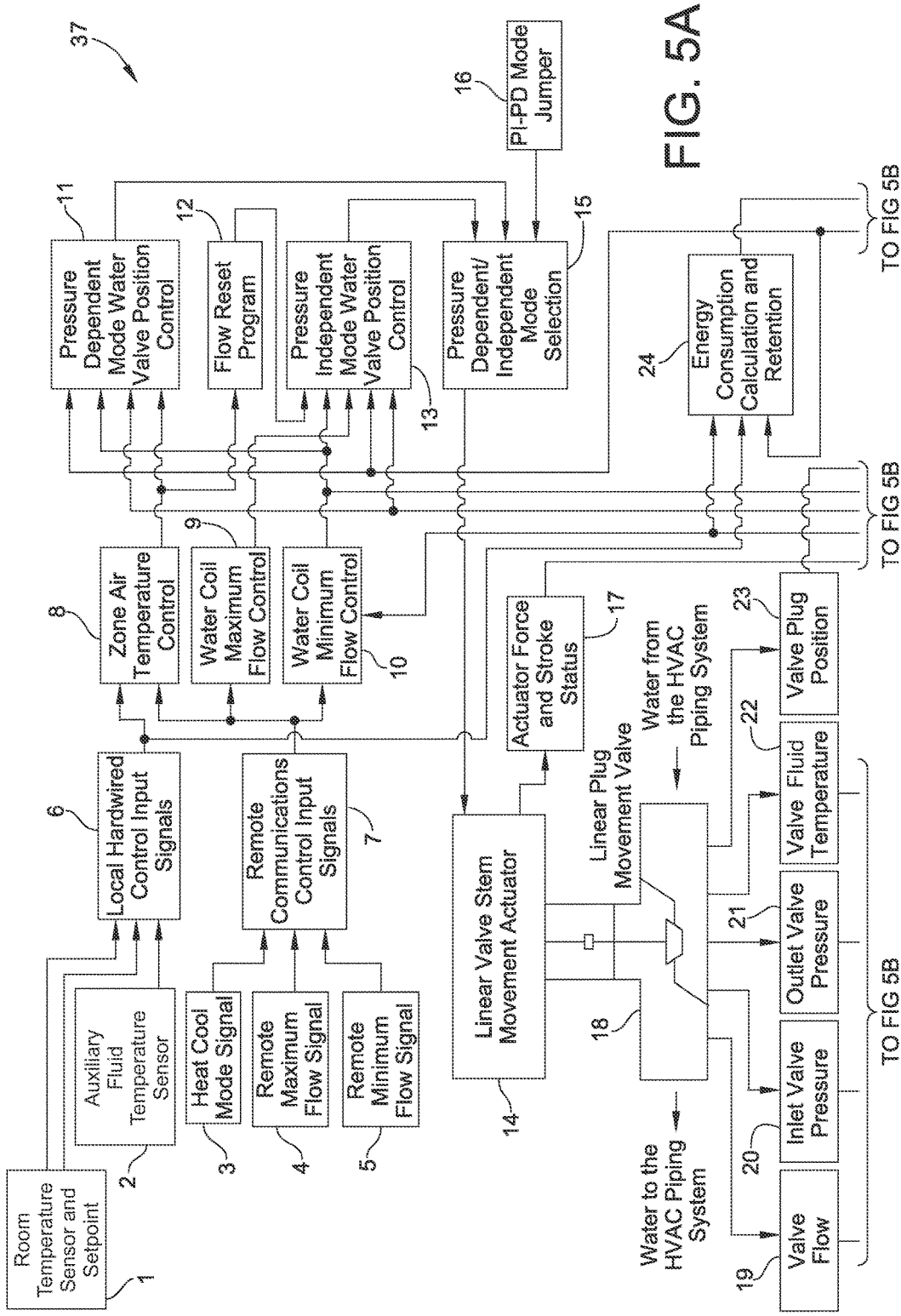
FIGS. 5A and 5B are schematic block diagrams of an HVAC system and integrated valve and actuator assembly, constructed in accordance with an embodiment of the invention.
Figure 5B:
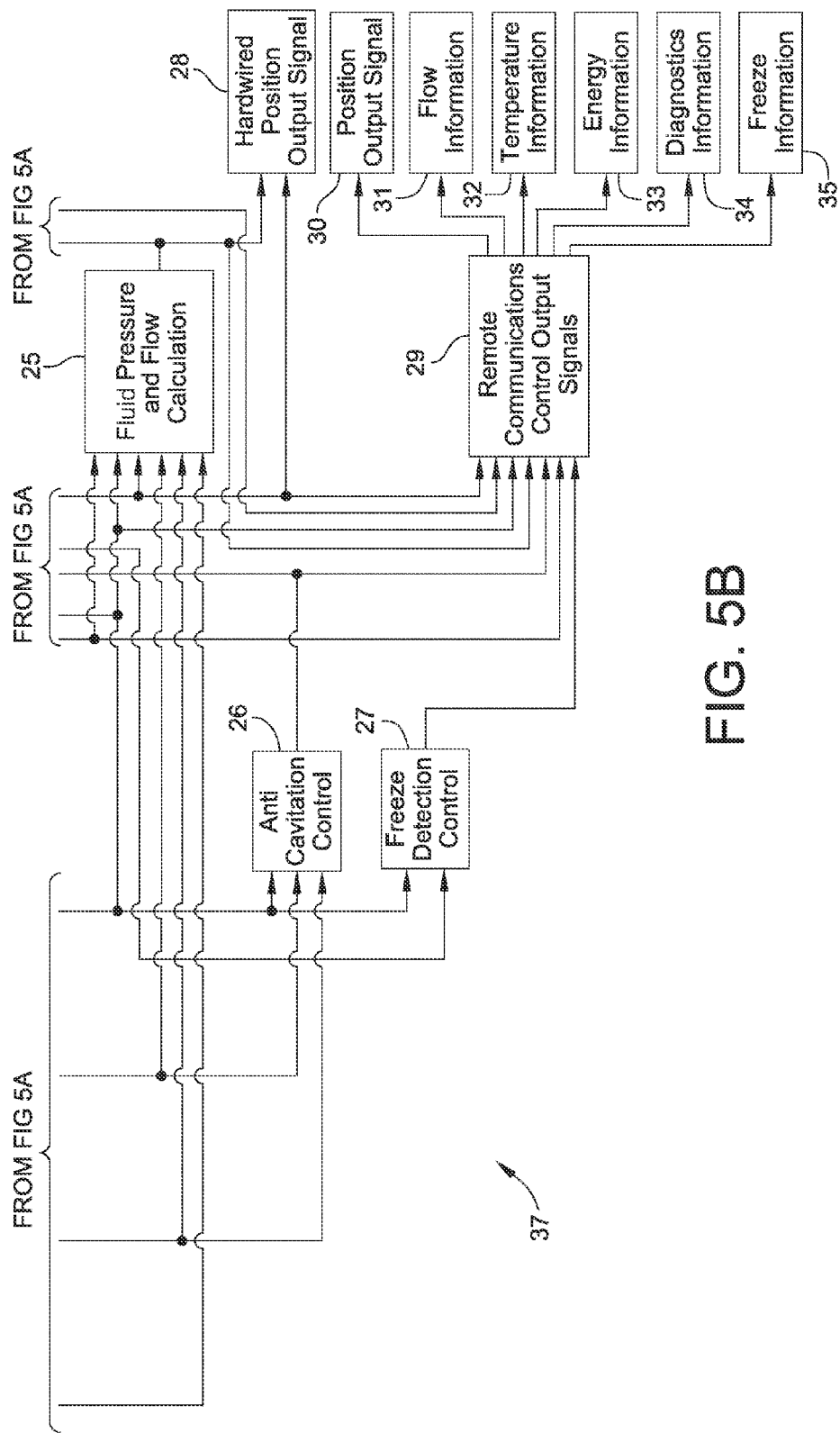

The schematic diagrams of FIGS. 5A-10, which will be described below, illustrate various improvements over the prior art. In accordance with an aspect of the invention illustrated in the schematic diagram of FIGS. 5A and 5B, a valve and actuator assembly 37 includes a valve 18, an actuator 14, a room temperature controller 8, an auxiliary fluid temperature sensor 2, a fluid temperature sensor 22, a valve flow rate sensor 19, fluid pressure and flow calculation module 25, and energy consumption calculation and retention module 24 in one integral assembly that is much faster to install because only one device has to be mounted and wired, rather than multiple separate devices, as with the system 110 of FIG. 1. The embodiment of FIGS. 5A and 5B also show that the valve 18 includes and inlet valve pressure sensor 20 and an outlet valve pressure sensor 21 so that the pressure drop across the valve 18 can be obtained. FIGS. 5A and 5B show the invention with the valve and actuator assembly 37 having the entire functionality of several traditional devices, all requiring individual mounting and interconnective wiring. The valve and actuator assembly 37 can be field-configured to operate as a pressure-dependent or a pressure-independent valve, and will provide energy efficient freeze protection in either valve control mode.

In one embodiment of the invention, a communications network is constructed in conformance with the layered interconnection networking model. Layered interconnection networking models include the abstract protocol independent seven-layered Open System Interconnection (OSI) conceptual model (ISO/IEC 7498-1) and the later formulated updated protocol dependent four layered TCP/IP conceptual model sometimes referred to the Internet model or less frequently the Department of Defense (DOD) model to break processing activities into a hierarchical series of network services and their respective independently defined tasks, activities, and components used to transfer data over a transmission medium between two or more networked entities. Both models are based on the concept of independent protocol stacks. The OSI model was conceived and implemented by the International Organization for Standardization (ISO) and the International Telecommunications Union-Telecommunication Standardization Sector (ITU-T). The TCP/IP model (RFC 1122) originally had four layers and was later proposed by others to contain five layers by the expansion of the original lowest layer, the network access layer, into the data link layer and the lowest physical layer. The models describe a general set of guidelines and processes of specific protocols for network communications including end to end connectivity, addressing, transmittal, formatting, routing, and receipt of data. The OSI model defines strict layering in contrast to the TCP/IP's more loosely defined layer definitions.

A communications protocol establishes the procedural binary rules for the syntax, semantics, and format and synchronization for communicating over a computer network or BMS. The protocol may be implemented in software or hardware or both, and defines the methods for the data structure, authentication, error detection, and procedures for handling lost or damaged packets to achieve data transfer between computing and control entities. A layer does not define a particular single protocol. Instead it defines a data communications function that can be performed by a number of protocols such that each layer may contain several protocols each providing a service that is relevant for the function of that layer and the network architecture. A Local area network (LAN) is a collection of geographically contained entities communicating over a shared medium. A Wide Area Network (WAN) is a collection of geographically separate LANs connected in various ways incorporating multiple services.

The layers are presented as a stack that handle how data is prepared for transmittal. A layer (N) is a collection of conceptually similar functions that requests services from the next lower layer (N−1) and provides services to the next higher layer (N+1) for the purpose of communicating with the corresponding layer of other entities. The requesting and providing instances on a given layer are connected by a horizontal protocol on that particular layer. When starting with upper layer protocols a specific unit of data interface or Service Data Unit (SDU) is passed down to the next layer (N−1) semantically unchanged to a peer service user. The highest OSI model layer, the application (7) layer knows the structure of the data in the SDU, but the lower layers have no knowledge of the prior level nested exchanges and treat the data as payload. Except for the physical (1) layer, the lower layer (N−1) prepends a header also known as Protocol Control Information (PCI) and/or optionally appends a trailer also known as a PCI to the SDU thus transforming it into the corresponding Protocol Data Unit (PDU) type for that (N−1) layer during an encapsulation process. The PCI typically includes the destination and source addresses, protocol type used in the current layer (N), flow control options, and sequence numbers to retain the data order. The optional PCI contains check sums, usually Cyclic Redundancy Checks (CRC), to verify that the data is undamaged. The PDU type is defined for each layer, and the PDU can be embedded in other PDU.

The data includes the originating layer's data along with all the transit layers' encapsulated PCIs because each layer (N) processes the data from the next highest (N+1) layer as opaque uninterpretable information. Data passed upwards between layers is unencapsulated before being passed further up. A particular layer (N) in the OSI model can communicate with the layer directly above it (N+1), the layer directly below it (N−1), and virtually to its peer layer level in other network entities. Only on the lowest physical (1) layer is there a physical connection for exchanging signals. Different network entities implement various subsets of the protocol stack. Repeaters and multiport repeaters (hubs) use the physical (1) layer, bridges and multiport bridges (switches) use the physical (1) and data link (2) layers, and routers use the physical (1), data link (2), and network (3) layers. The Physical (1), Data Link (2), and Network (3) layers provide consistent communications between the network entities. The Transport (4), Session (5), Presentation (6), and Application (7) layers process the end to end communications between the data source and destinations.

The OSI model physical (1) layer is essentially hardware in nature and defines the physical and electrical device specifications including the relationships between the device and the network's physical communications media by transmitting raw data bit streams over a physical medium. The physical layer is hardware specific and deals with the specific physical connection between the device and the network medium including the topology, data rates, maximum transmission distance, bit synchronization, and termination. The physical (1) layer implementation can be either Local Area Network (LAN) or Wide Area Network (WAN), and can be coaxial cable, optical fiber, wireless, twisted pair, or other transmission media. The lower boundary of the physical (1) layer is the physical connector attached to the transmission media, and, thus, the transmission media itself is outside the scope of the physical (1) layer, and is sometimes called the (0) layer. The Institute of Electrical and Electronics Engineers (IEEE) 802.3 (Ethernet), 802.4 (Token Bus), 802.5 (Local Area Networks, Token Rings), 802.11 (Wireless Ethernet), and other standards apply to this layer.

The ISO model data link (2) layer is the protocol layer that provides the functional and procedural means to transfer data between network entities over an immediate physical network by means of topology packaging of raw data from the physical (1) layer into frames or logical structured packets of data. The IEEE divided the data link (2) layer into the Logical Link Control (LLC) and the Media Access Control (MAC) sub layers. The LLC interfaces with the network (3) layer, and maintains control of the frame synchronization, flow control, and error checking between two entities by establishing a series of interface points called service access points (SAPs). IEEE 802.2 defines the LLC protocol that may provide both acknowledged and unacknowledged connectionless and connection orientated services. The MAC interfaces with the physical (1) layer, and is used to coordinate the sending of data between entities by controlling the transmission of packets from one Network Interface Card (NIC) to another over a shared media channel. The MAC addresses in the entities NIC cards constitute the low level addresses used to determine the source and destinations of network data traffic. The IEEE 802.2 (LAN Logical Link Control), 8886 (Data Link Service), and other standards apply to this layer.

The ISO model network (3) layer controls internetwork communications including logical addressing and routing. It establishes the processes of transferring variable length data packages between systems in a network or possibly different networks using network layer entity addresses to maintain track of destinations and sources. The network layer (3) processes include the structure and use of global logical addressing from a source to a destination across the network as a whole and routing to entities that are more than one link from another while maintaining the quality of service requested by the transport (4) layer. The addressing is different from the data link (2) layer's MAC addressing, and often implements Internet Protocol (IP) to define network addresses such that the route selection can be determined systematically by use of a comparison of the destination network address, source network address, and subnet mask. The network layer is repackaged by routers every time the link changes. IP manages the connectionless transfer of data packets from the source entity to the destination entity using uniform IP addressing and propagated router hops. It is not responsible for reliable delivery, but will detect corrupted packets so they can be discarded.

The ISO model transport (4) layer does not directly send data, but is responsible for the reliable transfer of data. It accepts the data from the session layer, and segments the data for transport across the network by transferring data between source and destination processes with the disassembly and assembly of the data before and after transmission. The Transport (4) layer defines five classes of connection mode transport protocols ranging from Transport Protocol Class 0 (TP0) through Transport Protocol Class 4 (TP4), and maintains the reliability of a given connection through flow control, segmentation/desegmentation, multiplexing of data sent to lower layers, de-multiplexing of data received from the lower layers, and error control. The sending entity will break the data into smaller packets so that if any packet is lost in transmission as determined by a lack of acknowledgement from the destination entity the missing packet can be sent again. The two most commonly used protocols at the transport (4) layer are Transmission Control Protocol (TCP) and User Datagram Protocol (UDP). TCP is a connection oriented protocol that sends data as an unstructured steam of bytes, and makes sure that end to end communications path is functioning by sending back an acknowledgement for every packet received and for putting any packets received out of order back into correct order. UDP is connectionless and therefore has less overhead without a persistent state of transaction between endpoints and an end to end communications path acknowledgement, but is a, best effort, unreliable connection because measures are not taken to assure that the data is received by the target entity. The transport (4) layer PDU is segment for TCP or the datagram for UDP.

The ISO model session (5) layer coordinates multiple presentation (6) layer processes communicating between end entities. It allows users on dissimilar entities to setup multiple transport (4) layer sessions between them by establishing, managing, and terminating connection sessions between the local and remote applications including control and management of multiple simultaneous (full-duplex) and non-simultaneous (half-duplex) bidirectional or single direction (simplex) messages in order for the application to be notified if all the series of messages were not completed. This layer is responsible for the orderly close of sessions before the acceptance of a new request, which is a trait of TCP as well as session recovery. This layer is typically implemented in application environments that use procedure calls. In practice, entities frequently combine the session (5) layer with the transport (4) layer.

The ISO model presentation (6) layer is sometimes called the syntax layer. It defines the syntax and semantics that network hosts use to communicate and provides data representation by the definition and encryption of data types from the application (7) layer. When data representation formats such as standard text, image, sound, and video is transmitted from sender to receiver the presentation layer translates the data to a common format which can be read by both devices. Presentation (6) layer application examples include image conversion, data compression, character code translation, scripting, data encryption, and data conversion.

The ISO model application (7) layer has direct user interface, and provides the necessary services that support network applications and keeps track of how each device interfaces with other applications with destination and source addresses linked to specific applications. Common functions at this layer include opening, closing, reading and writing files, executing remote jobs, and obtaining directory information pertaining to network resources. Application (7) layer application examples include the protocol for remote file access, directory services, resource sharing, scheduled messaging, mail transfer, and network management.

FIG. 2 is a juxtaposition of the seven OSI model layers and the four TCP/IP model layers. The OSI is a de jure model and TCP/IP is a de facto model. The OSI model is prescriptive in that each layer (N) must go through all (N−1) layers below it in contrast to the TCP/IP model that is descriptive leaving more freedom for implementation. The TCP/IP model's application layer equates to the OSI model's session (5), presentation (6), and application (7) layers as interpreted by the argument that the OSI model's presentation (6) and portions of its session (5) layers' processes and protocols do not exist as separate internet applications. The TCP/IP does not have a session layer because TCP is a connection oriented protocol that establishes sessions first before transferring IP packets. The TCP/IP model's transport layer equates to the OSI model's transport (4) layer plus a small part of its session (5) layer, however the TCP/IP model's transport layer using UDP does not always guarantee reliable delivery of packets as the OSI model's transport (4) layer does. The TCP/IP model's internet or network layer corresponds to the OSI model's network (3) layer. The TCP/IP model's link layer comprises the functions and processes of the Ethernet set of protocols which equates to the OSI model's data link (2) and physical (1) layers.

The Building Automation and Control Network (BACnet) ASHRAE/ANSI Standard 135 1995, ISO 16484-5 2003 developed by the American Society of Heating, Refrigeration, and Air-Conditioning Engineers (ASHRAE) BACnet specifically for the purpose of building automation incorporates a layered protocol architecture based on a collapsed version of the OSI model using the application (7), network (3), data link (2), and physical (1) layers. BACnet is a non-connection protocol that relies on UDP for message delivery on IP networks, and, therefore, does not need a transport layer because it does not have a request for message segmentation and end to end error detection. The BACnet application layer provides the functions normally performed by the transport (4) layer, the session (5) layer, and the presentation (6) layers which are not needed because BACnet uses a fixed encoding procedure and uses the application layer for security.

LonTalk, ANSI standard ANSI/CEA-709.1-B, European Building Automation Standard EN14908-1 was developed by Echelon as part of the LonWorks product suite to establish a complete architecture for automatic systems for use with distributed sensor, control, and actuator networks for buildings, factories, and instrumentation applications. LonTalk covers all seven OSI layers, and is based on the LAN architecture including intelligent group, subnet, and domain directing routers and gateways.

Konnexbus or Konnex (KNX) sometimes referred to as EIB Instabus (CENELEC (European Committee for Electrotechnical Standardization) EN 50090, ISO/IEC 14543-3) is a standardized OSI layer based network protocol for intelligent building, and is a convergence of and successor to the European installation bus (EIB), European Home Installation bus (EHS), and BatiBus (Building Bus). KNX is based on the EIB communications stack along with the EHS and Batibus physical layers, configuration modes, and applications. KNX supports three configurations mechanisms. Automatic (A) mode is for low level networks, Easy (E) mode has no advanced tool requirements, and system (S) mode requires configuration tools for network setup.

Modbus is an industrial control protocol developed by Modicon who is now Schneider Electric in 1979. The first Modbus implementation was used for serial data communications such as RS485 and RS232 which is now known as Modbus RTU. Later additions to the Modbus protocol include TCP and American national Standard Code for Information Exchange (ASCII). Modbus is now used for other applications including HVAC. Modbus defines a simple PDU consisting of a function code and data field that is independent of the standard layer PDUs. A header and trailer are added to the PDU to add addressing and error checking converting it to a Modbus Application Data Unit (ADU).

M-Bus is a European standard covering heat, water, gas, and electrical consumption and energy meters and various types of valves and actuators. M-Bus is defined by European Norm (EN 13757) which includes the specifications for both wired and wireless M-Bus devices. The M-Bus packets currently only include the source or destination metering device only and are thus not suitable for direct end to end routing. A M-Bus system specifies the physical (1), data link (2), and application (7) layers plus the network (3) layer for optional extended addressing.

Wireless Fidelity (Wi-Fi) is based on the IEEE 802.11 series of specifications and is licensed by the Wi-Fi Alliance for Wireless Local Area Networks (WLANs). The Wi-Fi network contains one or more Access points (APs) each having a valid communications range or hotspot for network or peer to peer connectivity.

ZigBee is a family of wireless code efficient communications protocols based on the IEEE 802.15.4 standard for radio frequency applications. IEEE 802.15.4 Personal Area Network (PAN) specifies a Carrier Sense Multiple Access/Collision Avoidance (CSMA/CA) channel access activity detection with provisions for periodic presence detecting beacons, Guaranteed Time Slots (GTS), and message acknowledgements. ZigBee defines Full Function Devices (FFD) with good access to power providing router or coordinator support capability and Reduced Function Device (RFD) locally powered and therefore capable of end device functionality only. ZigBee objects are logically connected by direct or coordinated bindings by means of their unique MAC addresses. The ZigBee protocols are typically used in embedded applications with low data rates, secure networking, and low power consumption.

EnOcean GmbH is a Germany-based venture funded technology wireless products supplier founded in 2001. The EnOcean wireless protocol ISO/IEC 14543-3-10 was designed for ultra-low power consumption including kinetic electrodynamic, differential thermoelectric, and solar energy harvesting. EnOcean communicates with TCP/IP, Wi-Fi, KNX, BACnet, and LON.

Communicating commercial and industrial systems that involve processes in which liquids are supplied via fluid control systems to monitor and track energy usage contain an appropriate network architecture to report back, respond to, and record and archive flow and energy data. In certain network embodiments, the network will consist of a distributed processing network consisting of a WAN, local supervisory LAN, primary controller LAN, and secondary controller LAN. The internet based WAN connecting multiple facilities with a central data server is accessible with via a standard web browser. The local supervisory LAN is an Ethernet-based system connecting primary control LANs and Operator Workstations (OWS) to Building Controllers (BC). The primary controller LAN is a high speed Ethernet LAN used to connect BCs to Application Specific Controllers (ASC), Freely Programmable Controllers (FPC), and Field Devices (FD) including sensors and actuators. The secondary controller LAN is a lower speed LAN that may alternately be used to connect BCs to ASCs, FPCs, and FDs utilizing serial two conductor mediums such as EIA-485 and wireless mediums for price sensitive speed agnostic installations. The control valve and actuator assembly resides on the OSI conceptual model application (7), network (3), data link (2), and physical (1) layers. The network (3) layer is required for applications utilizing the primary controller LAN but not applications utilizing the secondary controller LAN. Embodiments of the invention will provide different protocols in accordance with the network requirements of a particular project. FIG. 3 shows a diagram of an exemplary system having OSI model layers, protocols, and medium usage.

In certain embodiments, the valve and actuator assembly acts as an FD on either the primary controller LAN or secondary controller LAN to accept valve member positioning commands from an external controller to control the flow of fluid and optionally report back the valve's fluid flow and fluid energy consumption. In other embodiments, the valve and actuator assembly acts as an ASC on either the primary controller LAN or secondary controller LAN to directly sense a controlled temperature or humidity medium and position the valve member to alter the fluid flow to maintain the controlled temperature or humidity and optionally report back the valve's fluid flow and fluid energy consumption.

Control valves throttle the flow of a fluid by having their closure members move in their valve bodies to block the fluid flow at one end of movement and open the flow at the other end of movement. The closure member may be referred to as a plug for a self-actuated pressure-independent linear movement valve, a pressure-dependent linear movement valve, or a globe valve, a disc for a butterfly valve, a ball for a ball valve, or other terms unique to the valve type. The valve closure member has contact with the valve seat to block water flow. As the valve closure member opens the fully blocked valve seat starts to open toward its maximum area. Valve seats are usually round, and their flow volume capacity when fully open can be mathematically expressed as:

Q=V2.44799377 Vsd²

Q=Flow in Gallons Per Minute
V=Fluid Velocity in Feet per Second
Vsd=Valve Seat Diameter in Inches
In the International System of Units the flow volume capacity of a valve seat with a fully round valve closure member can be mathematically expressed as:

Q=V.0785398Vsd²

Q=Flow in Liters per Second
V=Fluid Velocity in Meters per Minute
Vsd=Valve Seat Diameter in Centimeters The valve closure member may have a variety of shapes either symmetrical or unsymmetrical, and is connected to a stem and seal that exits the valve body to allow an actuator located outside the valve to position the valve stem and closure member. The seal is designed to have secure contact with the valve body stem and the valve body stem outlet such that it prevents fluid from leaking out of the valve while the valve is operating at its rated static and differential pressure ratings. Some control valves, such as globe and gate valves, require linear stem movement to fully open to close the fluid flow and other types, such as ball, butterfly, and shoe valves, require rotary movement to fully open and close the fluid flow.

Pressure-dependent control valves are selected primarily on pressure drop through the coil, valve flow coefficient factor, and close-off rating. The valve flow coefficient factor is the measurement of flow expressed by the term Cv which is defined as one US gallon (3.8 liters) of 60° F. (15.6° C.) water during one minute with a one psi (6.9 kPa) pressure drop. A valve's rated Cv is taken when it is fully open, and will vary when the valve closure member is at other positions. At a particular valve closure member position the flow rate of the pressure dependent valve changes based on the differential pressure across the valve (which varies with the pump curve and interaction of the other valves in the system).

The Cv can be expressed with pure water as the media mathematically as:

$$Cv = \frac{GPM}{\sqrt{\Delta P}}$$

The Cv can be expressed mathematically with other fluids as the media as:

$$Cv = GPM \sqrt{\frac{SpecificGravity}{\Delta P}}$$

Cv=Coefficient of Flow
GPM=US gallons per Minute at 60 F, 15.6° C.
ΔP=Differential pressure in PSI
SpecificGravity=Specific Gravity of the Fluid In the International System of Units the Cv is expressed as the Kvs which is defined as the flow in cubic meters per hour (m3/h) of 15.6° C. water with a pressure drop of 100 kPa (1.0 Bar) with the valve fully open, and can be expressed mathematically with pure water as the media as:

$$Kvs = \frac{m3/h}{\sqrt{\Delta P}}$$

In the International System of Units, the Kvs can be expressed mathematically with other fluids as the media as:

$$Kvs = m3/h \sqrt{\frac{SpecificGravity}{\Delta P}}$$

Kvs=Coefficient of Flow
m3/h=Cubic meters/hour at 15.6° C.
ΔP=Differential pressure in Bar (1 Bar=100 kPa)
SpecificGravity=Specific Gravity of the Fluid The specific gravity of a liquid is the ratio of the density of the liquid compared to the density of pure water at 39° F., (4° C.). Specific gravity is a ratio which has no units. A liquid with a specific gravity less than one will float in water because its density is less than the density of water. Conversely a liquid with a specific gravity greater than one will sink in water because its density is greater than the density of water. Ethylene and propylene glycol water mixtures have specific gravities of greater than one and therefore have a density greater than water.

When the water flows through a valve, it accelerates in the valve's restricted flow path which results in a decrease in pressure. The water reaches its highest velocity at a point called vena contracta. The fluid is at its lowest pressure and highest velocity at the vena contracta. As the water exits the valve some of the pressure loss is recovered as the liquid decelerates. As a consequence, the pressure in the valve may be lower than the downstream pressure. If the pressure in the valve drops below the vapor pressure of the water, it will start to vaporize. This condition, known as cavitation, will result in a lower flow rate than calculated in the Cv and Kv formulas above because when cavitation water bubbles form in the vena contracta, the vapor bubbles will increasingly restrict the flow of water until the flow is choked with vapor. This condition is known as choked or critical flow. When the flow is fully choked, the flow rate does not increase when the pressure drop is decreased.

When cavitation occurs, the water in the valve rapidly converts to a vapor and then experiences a pressure recovery to some pressure above the vaporizing pressure causing an implosion or collapse of the vapor bubbles. This can result in mechanical corrosion or pitting damage to the valve components immersed in the water, breakage of the valve components due to extreme vibration, and detectable noise in the valve. The valve components most at risk for cavitation damage are valve closure members and seats that have parallel running surfaces. The mechanical pitting and corrosion will vary with various valve material compositions. Cavitation occurs when the vapor pressure is more than the vena contracta pressure, but less than the outlet pressure. When the vapor pressure is less than the vena contracta pressure, there is full water flow with no cavitation.

Figure 11:
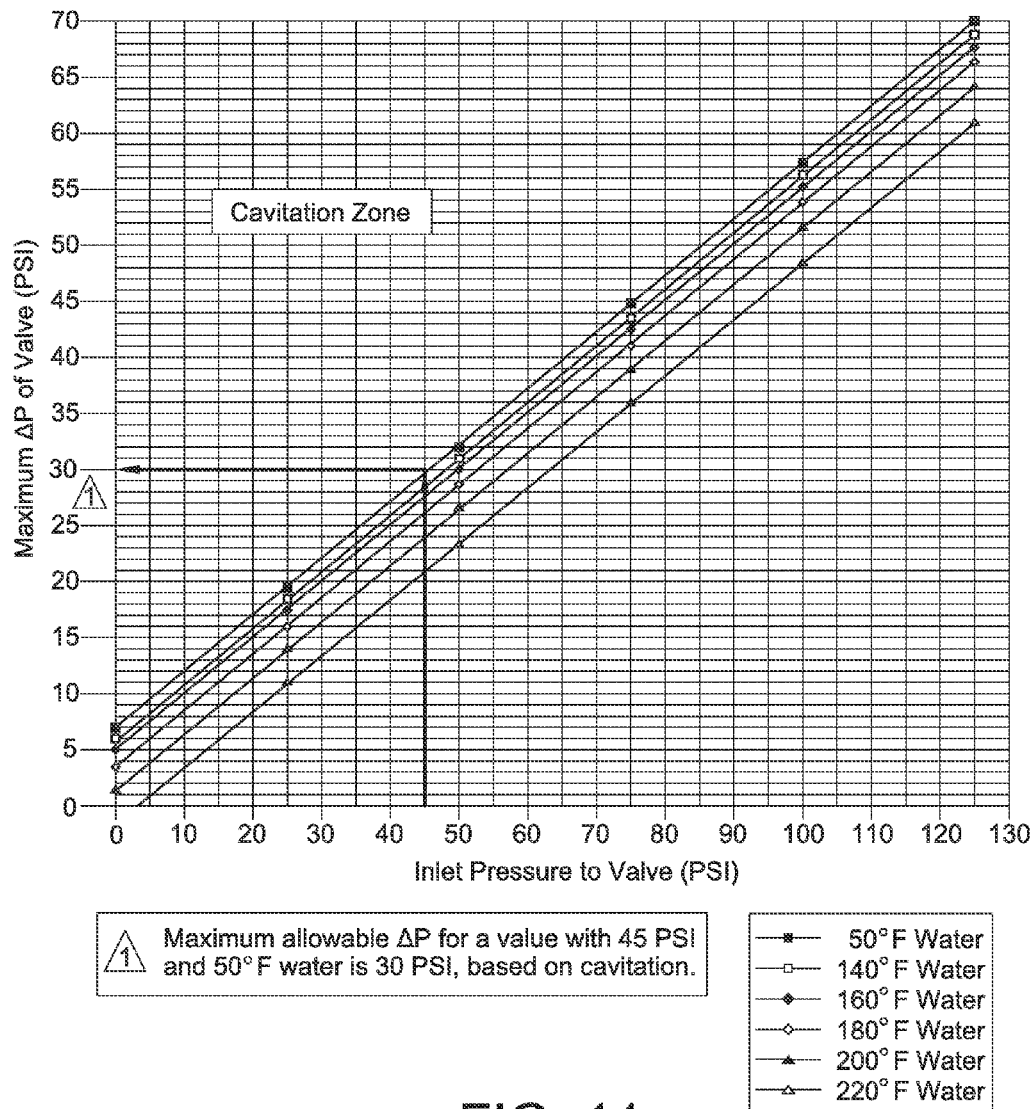
FIG. 11 is a graphical illustration of a cavitation zone water temperature relationship, in accordance with an embodiment of the invention.

The maximum allowable pressure differential across a valve that is possible without a cavitation condition depends upon the temperature of the water, because the vapor pressure of the water varies with the water temperature. When water is in a confined closed container, an equilibrium exists between the water and its gaseous state. The vapor pressure does not depend on the amount of water. The boiling point is the temperature where the vapor pressure reaches the atmospheric pressure, which varies with the altitude. Since the vapor pressure of water increases with water temperature, with warmer water the cavitation condition occurs at lower differential pressures than with cool water, as shown in FIG. 11. For example, the maximum allowable differential pressure without cavitation for a valve with a 45 psi (310 kPa) inlet pressure and 50° F. (10° C.) water temperature is 31 psi (214 kPa). With the same 45 psi (310 kPa) inlet pressure and with a 220° F. (104° C.) water temperature the maximum allowable differential pressure without cavitation drops to 21 psi (145 kPa).

Vapor pressures vary with the type of liquid. Although different liquids have vapor pressures that all generally increase as the temperature increases, and which decrease as the temperature decreases, the rate of change, as well as the boiling point, varies with each liquid. Glycols have lower vapor pressures than water and their boiling points are above the boiling point of water. At 68° F. (20° C.), the vapor pressure of water is more than 100 times as great as that of propylene glycol. The vapor pressure of systems containing a mixture of ethylene glycol or propylene glycol and water will be different than the vapor pressure of systems with just water. Further, the vapor pressures will vary with the concentration volume of ethylene glycol or propylene glycol relative to the water in the system. Water systems using a glycol water mixture rather than just water will have different cavitation points as a result of their different vapor pressures.

Indirect contact heat exchangers provide thermal energy transfer from a fluid to another fluid without the two fluids having to mix together or come into direct contact by means of heat transfer through an impervious dividing wall. In addition to cooling down or heating up fluids in a single thermal phase, heat exchangers can be used for a second phase at a constant temperature of an isothermal process creating boiling causing a liquid to evaporate or condensing causing a gas to condense. Fluid density variations caused by temperature differentials and subsequent fluid expansion create buoyancy forces for natural or free convection heat transfer and external pumps induce forced convection heat transfer through the heat exchanger and piping system. Within the heat exchanger direct physical contact between any stationary fluid and heat exchanger conductive wall surface boundaries provides conduction heat transfer from kinetic energy as rapidly moving atoms and molecules interact with adjacent atoms and molecules transferring some of their heat between the two mediums.

Commercial and industrial heat exchanger systems are designed to control the required temperature and humidity loads using the least amount of energy by means of an Energy Conservation Measure (ECM). Measurement and Verification (M&V) for system installations is the process of recording the actual energy usage with a direct data comparison to the system's theoretical energy usage calculated during its design to verify the cost avoidance of an energy efficient design. The M&V for retrofit upgrade of existing systems is the process of recording the actual energy usage of the upgraded system with a direct data comparison to the system's original energy usage before upgrading to verify the cost avoidance of an energy efficient design. Both the system installation and retrofit upgrade M&V processes include adjustments for any changes in the process control parameters as well as known changes to external factors including weather, load, and schedule changes with a minimum comparison duration of 12 months.

The M&V process must isolate the process controlled by the ECM with appropriate metering and utilize a logical evaluation in accordance with a good practice M&V protocol such as the International Performance Measurement and Verification Protocol (IPMVP), Federal Energy Management Program (FEMP), American Society of Heating, Refrigeration, and Air-Conditioning Engineers (ASHRAE) Guideline 14 Measurement of Energy and Demand Savings, or the Australasian Energy Performance Contracting Association (AEPCA) Best Practice Guide. The IPMVP and FEMP protocols were formulated by the United States Department of Energy (DOE) to describe different methods of determining the water and energy savings of energy efficient projects with the FEMP protocol focusing on federal energy projects. ASHRAE Guideline 14 provides the minimum acceptable level of performance in the measurement of energy savings from residential, industrial, and commercial building energy management projects. The AEPCA Best Practice Guide is based on a combination of the IPMVP, FEMP, and ASHRAE Guideline 14 primarily focusing on energy savings performance contracts.

Continuous fluid energy monitoring of the heat absorbed or given up by a heat conveying fluid across a heat exchanger can be achieved by a heat meter which consists of discrete flow meters, temperature sensors, and an energy calculating module or with a combined factory-assembled assembly providing the combined functionality of the totality of discrete components. These energy monitoring components are dedicated components and the fluid system also requires a separate automatic control valve. Global heat meter standards include the Measuring Instruments Directive (MID) European union (EU) EN1434 which establishes a common guideline for 27 countries of the EU, the International Organization of Legal Metrology {French: Organisation Internationale de Métrologie Légale} (OIML) International Recommendation R75 harmonized with EN1434, and the Canadian Standards Association (CSA) C900 general heat meter requirements based on EN1434 with deviations.

Automatic control fluid valves are used to control temperature and humidity loads by circulating fluid to liquid-to-liquid heat exchangers, liquid-to-gas heat exchangers, gas-to-gas heat exchangers or gas-to-liquid heat exchangers. Common fluids include water, water glycol solutions, steam, and refrigerants. Energy used to increase or decrease a sensible fluid temperature can be empirically calculated and expressed in units of energy. A British Thermal unit (BTU) is the traditional unit of measurement for energy, with 100,000 BTUs equating to one therm and 12,000 BTU/h equaling one ton, and equates to the amount of energy required to heat or cool one pound of pure water by 1° F. at a temperature of 39.1° F. and a pressure of one atmosphere or 14.696 psi. The amount of sensible thermal energy transferred through a single phase liquid media heat exchanger can be expressed as:

$$BTU/h = FuFwFsh(|To-Ti|)60$$

BTU/h=BTU per Hour
Fu=Fluid Volume in Gallons per Minute
Fw=Fluid Weight in Pounds per Gallon
Fsh=Fluid Specific Heat BTU/lb. ° F.
To=Temperature Exiting the Load ° F.
Ti=Temperature Entering the Load ° F.

In the International System of Units the Joule is the amount of energy required to heat or cool 0.454 kilograms of pure water by 0.56° C. at a pressure of one atmosphere or 101.325 kPa. Each Joule equals the force of one Newton acting through one meter, 0.239005736 thermochemical calories, 0.0009478673 BTUs, 1 watt-second, or 0.00027777 watt-hour. The amount of sensible thermal energy transferred through a single phase liquid media heat exchanger can be expressed in the International System of Units as:

$$Kw = FuFwFsh(|To-Ti|)60$$

Kw=kilowatts per Hour
Fu=Fluid Volume in Cubic Meters per Minute
Fw=Fluid Weight in Kg per Cubic Meter
Fsh=Fluid Specific Heat Joules/g ° C.
To=Temperature Exiting the Load ° C.
Ti=Temperature Entering the Load ° C.

The specific heat of a substance is the substance's amount of endothermic or exothermic thermal energy that must be transferred to or from one amount of a substance's mass to change its single thermal phase temperature by a defined amount. When cold and hot substances come into contact heat spontaneously passes between the substances until they reach a thermal equilibrium. More thermally insensitive substances have higher specific heat values because for a given substance's mass for a particular thermal change more energy needs to be transferred to the substance relative to an adjacent substance having a lower specific heat value. The specific heat of pure water is higher than most other common substances, and is expressed by 1 Btu/lb. ° F. Although the thermochemical calorie unit of energy varies with starting temperature and atmospheric pressure, the specific heat of pure water in the metric system can be expressed as 1 calorie/g ° C. or ° K, and in the International System of Units as or 4.184 joules/g ° C. or ° K. Ethylene and propylene glycol mixtures have specific heat values lower than water and consequentially have reduced heat capacity. Second phase heat variables that don't change the kinetic energy include the heat of vaporization required to evaporate a substance at its boiling point and the heat of fusion required to melt a substance at its melting point.

HVAC control valves are typically available in sizes to connect to ½", ¾", 1", 1¼", 1½", 2", 2½", 3", 4", 5", 6", 8" 10", 12", 14", 16", 18" and 20" inner diameter pipe sizes and metric equivalent diameter sizes. The smaller sized valves are available with a number of different flow coefficients that are manufactured by assembling different valve plugs and stems into the same size valve bodies that may also a different diameter seat ports. The different valve sizes and different flow coefficients available in the same size valves will have some variations in their full stem travel distance and with their stem's minimum and maximum travel points. These valve size and flow coefficients variations will cause some consequential errors on actuator positioning without autospan and in position feedback signal when it is provided by the actuator. Valve actuator assemblies can either be ordered pre-assembled by the manufacturer or can be purchased as a separate valve body and actuator and linkage and assembled by the installer. The assembly requires mechanical connections, tightening of fasteners, and sometimes the adjustment of couplers and spring pre-loads. Different installers will use different tools and will have different strength levels and as a consequence will install the units with some dimensional differences which can affect the valve travel.

Different actuator technologies and designs utilize different techniques for providing a position feedback signal for the valve stem and valve closure member. Common methods include the following:

1. Linear or rotary potentiometers provide an absolute position which can be used directly by a separate discrete controller or monitoring device. The controller or monitoring device must have a look up scaling table to convert the resistance to a corresponding actuator position.
2. Linear or rotary potentiometers provide an absolute position which is used by the actuator's circuitry to convert the resistance to another signal typically 2 Vdc to 10 Vdc or 4 mA to 20 mA or to an empirical digital value usually 0 to 100% if the actuator has communications capability.
3. Counting pulses from a magnetic or optical sensor or from a sensor embedded in the actuator's electric motor and comparing the count to the number of pulses it takes the actuator to fully stroke from its extreme end to end positions. With this method upon initial power up the actuator must first identify its current position by going to a known position. It typically performs this function by stroking to one end of its travel by knowing its complete travel time and then stroking for at least that time period to assure that it is at the end of travel if it has a mechanical or magnetic clutch or it will travel toward the end of its travel until it electronically senses that it has hit the end of travel if it has electronic stall circuitry. The actuator will then stroke to its other end and permanently store the number of detected sensor pulses. It will then respond to its input signal and count the number of pulses in its current position and then convert that to a position percentage by comparing the number of pulses in its current position to the total number of counts in its full travel. Since the number if sensor pulses for full travel is retentively stored in non-volatile memory upon additional power startups the actuator may only stroke to one end rather than going through its complete initial power up end to end initialization routine.

4. Digital encoders sense rotary position and convert it to binary outputs that are read and converted to a position percentage by knowing the maximum encoder output at its one end and the minimum encoder output at the other end which is usually set at a binary zero value.

Methods 2, 3, or 4 above can include a valve auto span process whereby the position feedback signal from an actuator can either be fixed to a particular actuator travel distance typically corresponding to the actuator's full travel or it can auto span itself after it is installed on a valve and has determined the valve stem's exact travel and scaled its input signal and its position output signal to track the valve's closure member movement range. This auto span may be initiated the first time the valve is powered up and put on the valve or by means of a manual command with the auto span parameters stored into non-volatile memory. The available position feedback signal from an auto-spanned actuator will usually be direct current voltage or current or an empirical digital value communicated to the BMS, but not resistive.

Valve actuator assemblies frequently provide direct current voltage or current signals such as 2 Vdc to 10 Vdc or 4 mA to 20 mA that are wired to a separate controller's analog input to provide the display, reporting, alarming, and energy trending of the valve's position to the BMS. The most common prior art method of providing a position feedback signal is to obtain the signal from the actuator in the assumption that it represents the valve position and is not affected by the actuator and linkage hysteresis and that the valve's position precisely follows the actuator's full end to end movements. Both of these two assumptions are not possible and the second requirement, in particular, can introduce a large error at one or both ends of travel and a consequential error in the mid stroke valve plug position. Valve actuators assemblies having communications capability typically process the same actuator position value and also may include the errors caused by the actuator and linkage hysteresis and null actuator movement because the valve stem movement may not always follow the actuator position.

Pressure-independent valves are generally selected based on the maximum design flow rate of the coils they are being used to control. Pressure-independent valves provide a constant flow volume with a particular control input signal irrespective of the differential pressure. Typically, this is accomplished either by use of an self-actuated pressure independent valve with an internal mechanical flow control mechanism or electronically by measuring or calculating the flow volume and automatically adjusting the valve closure member to maintain a constant flow volume. Pressure-independent valves provide this constant flow volume over a defined differential pressure range. They also have a maximum flow rate that limits the flow if the valve's control signal commands it to its full open position or if the differential pressure across the valve increases since the flow increases with either an increase in the valve's flow orifice size or an increase on the valve's inlet pressure.

Figure 4:
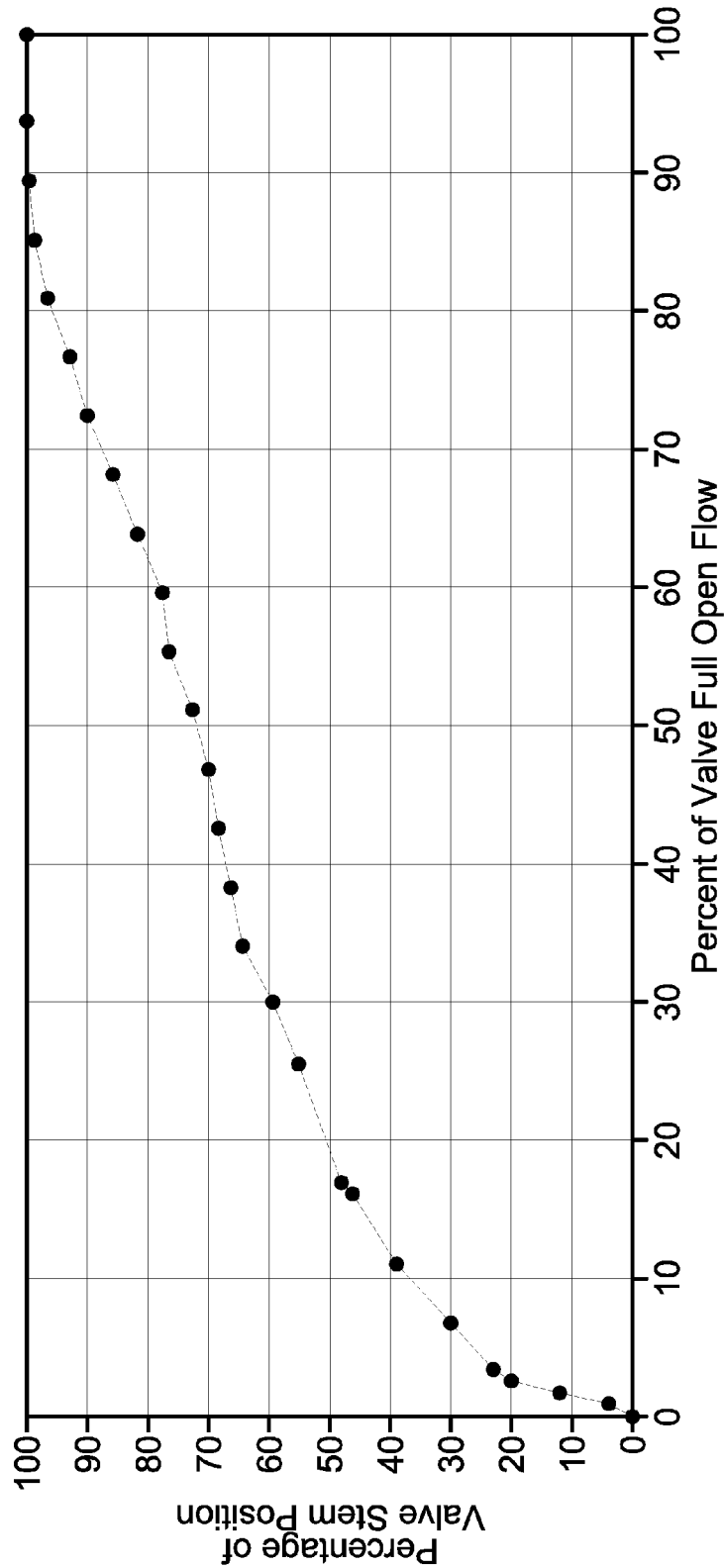
FIG. 4 is a graph showing the relationship between a mechanical pressure-independent valve body stem position and fluid flow.

Pressure-independent valves with internal mechanical flow mechanisms of various designs have different internal flow orifice geometries with specific design related relationships between the valve stem position and the fluid flow through the valve. At a given valve stem position the fluid flow through the valve will be consistent irrespective of the pressure drop across the valve within the constraints of the valve's designed minimum and maximum operating pressure differentials. Thus the valve will have a repeatable relationship between stem position and fluid flow that can be documented with a look up table or polynomial. FIG. 4 shows the relationship between a mechanical pressure-independent valve stem position and mechanically attached valve closure member and fluid flow through the valve. Different valve designs and different sizes of the same valve design will have different stem fluid flow relationships.

In particular embodiments, the valve and actuator system includes a pressure-independent valve with an internal mechanical flow control mechanism provides a cost effective indication of the fluid flow through the valve. In another embodiment, the valve and actuator system provides a cost effective indication of the fluid flow through the valve and calculate the energy consumed by the valve's controlled coil or load.

Referring to FIGS. 5A and 5B, and in a particular embodiment of the invention, the valve and actuator assembly 37 includes valve 18, valve actuator 14, room temperature controller 8, fluid temperature sensor 22, flow rate sensor 19, inlet and outlet pressure sensors 20, 21, valve closure member position sensor 23, and freeze detection controller 27 in one integral assembly. In more particular embodiments, the valve and actuator assembly 37 can be configured by the user for either pressure-dependent or pressure-independent valve control using a pressure-dependent valve body. In certain embodiments of the invention, the valve and actuator assembly 37 is configured to provide pressure-dependent or pressure-independent control using a separately connected temperature controller rather than an internal temperature controller.

In a particular embodiment, field selection between pressure-dependent and pressure-independent via jumper switch, for example, by selecting the desired mode on PI-PD mode jumper 16, shown in FIG. 5A. In some embodiments, the valve and actuator assembly 37 receives signals from the room temperature sensor 1 and room setpoint device 2, and determines whether there is a requirement to open or close the linear valve closure member movement valve 18, based on the difference between the room temperature sensor 1 and room setpoint 2. The linear valve closure member movement valve 18 is mechanically positioned by the linear valve stem movement actuator 14, which receives its signal from PI-PD mode selection device 15. The linear valve closure member movement valve 18 has a valve closure member that is movable along the longitudinal flow axis of the valve port positioned between its inlet passageway and outlet passageway. The linear valve closure member movement valve 18 includes a stationary sealing port, or valve seat, and a generally cylindrically-shaped outer valve closure member that travels in a linear plane from the stationary sealing port upward toward its maximum open position, which is limited by the opposite linear valve closure member movement valve 18 outer wall for pressure-dependent operation, or by the valve and actuator assembly 37 electronically controlled position for pressure-independent operation.

The linear valve stem movement actuator 14 can be set for sensitive or less sensitive control with a deadband setting to prevent overshoot in water systems that are oversized relative to the controlled area. The PI-PD mode selection device 15 utilizes either a pressure-dependent or pressure-independent control algorithm depending upon the position of the PI-PD mode jumper 16. When the valve and actuator assembly 37 is setup for a pressure-dependent valve operation from the PI-PD mode jumper 16, the PI-PD mode selection device 15 receives its signal from the pressure-dependent mode water valve position controller 11.

Figure 7:
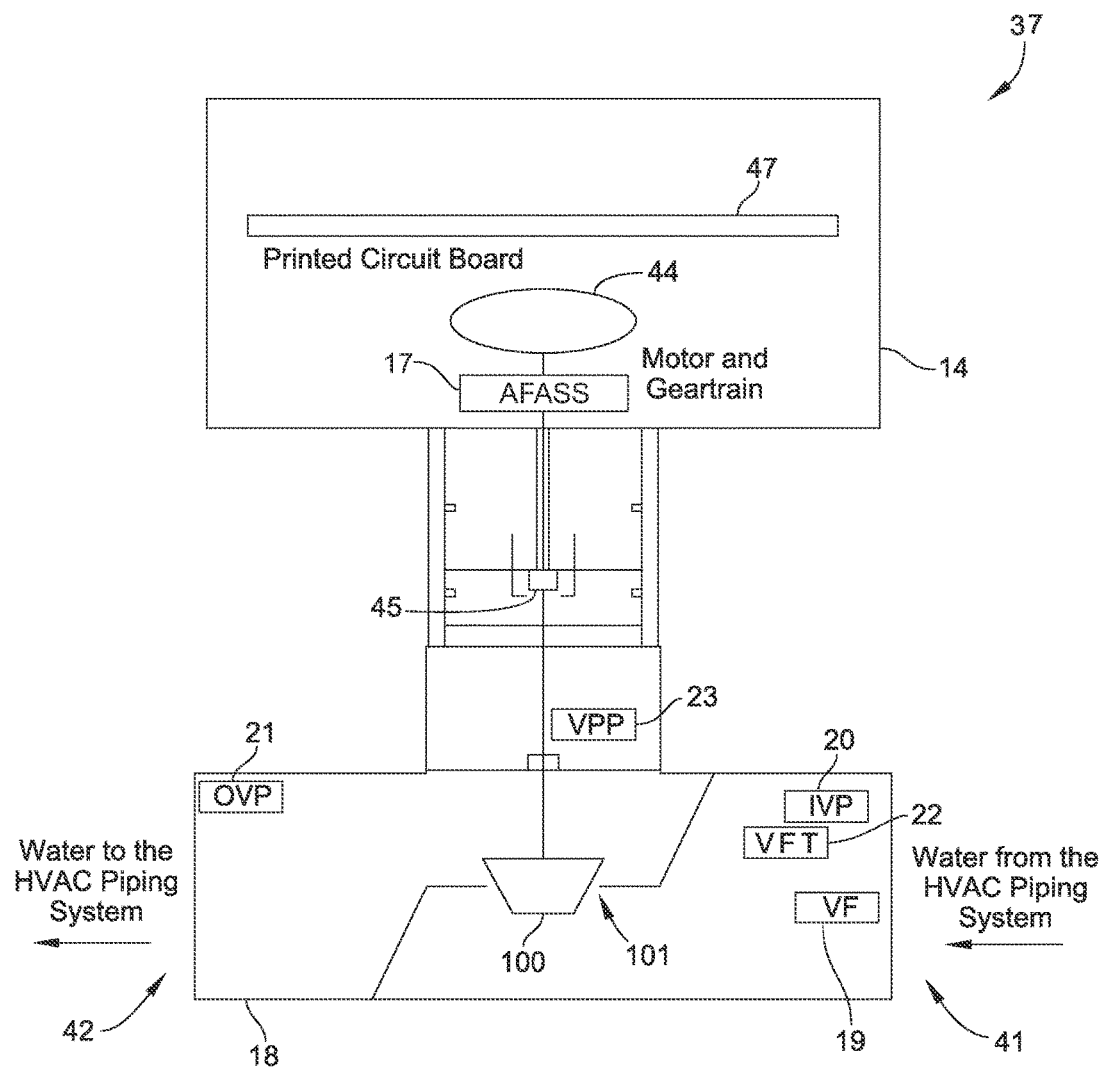
FIG. 7 is a physical diagram of the new art design contained in an integrated package.

FIG. 7 is a schematic diagram of the valve and actuator assembly 37 configured with integral freeze protection, in accordance with an embodiment of the invention. The valve and actuator assembly 37 includes the valve 18 with valve closure member 100, which seats in valve seat 101. The valve 18 further includes flow rate sensor 19, an inlet 41, which receives water or a water mixture from the HVAC piping system, with inlet pressure sensor 20, and an outlet 42, which supplies water or a water mixture to the HVAC piping system, with outlet pressure sensor 21. The valve 18 also has a fluid temperature sensor 22 and a valve closure member position sensor 23.

The valve closure member 100 position is controlled by the valve actuator 14, which positions the valve closure member 100 using a motor and geartrain 44 coupled to the valve closure member 100 via a linkage assembly 45. The valve actuator 14 further includes a circuit board 47, which in particular embodiments, contains circuitry for the various controllers, control modules, and network communications modules described herein and shown schematically in FIGS. 5A and 5B.

Figure 8:
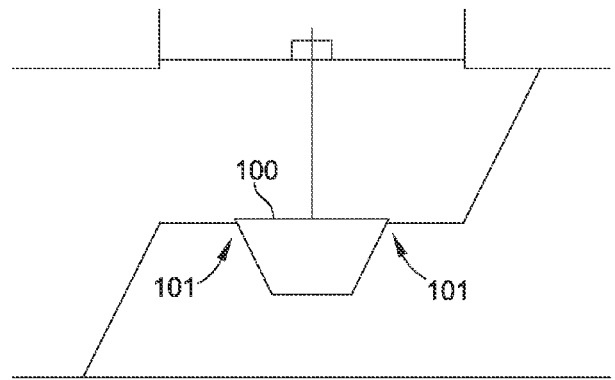
FIG. 8 is a schematic diagram showing the valve closure member closed, in accordance with an embodiment of the invention.
Figure 9:
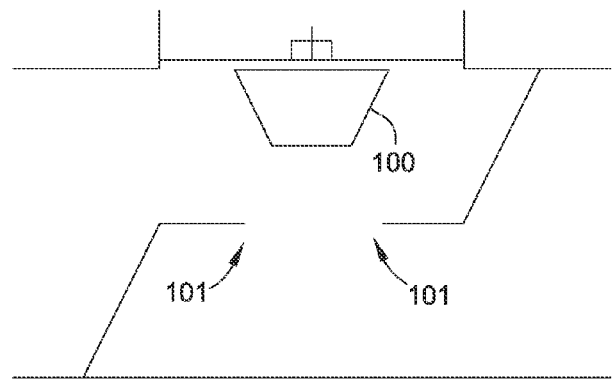
FIG. 9 is a schematic diagram of the valve closure member open for pressure dependent control, in accordance with an embodiment of the invention.
Figure 10:
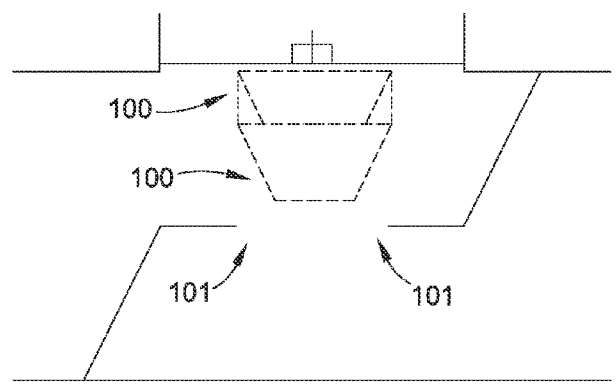
FIG. 10 is a schematic diagram of the valve closure member open for pressure independent control, in accordance with an embodiment of the invention.

FIGS. 8-10 are schematic representations showing various modes of operation for the valve closure member 100. Specifically, FIG. 8 shows the minimum-flow or closed position of the linear valve closure member movement valve's closure member 100. This shows the position of the valve closure member 100 when fully closed against the valve seat 101. In this position, there is no flow except possibly a very small amount of leakage through a possible small gap between the valve closure member 100 and the seat 101. The minimum-flow or closed position of the valve closure member 100 for the linear valve closure member movement valve is relevant for both pressure-dependent and pressure-independent valve operation.

When the PI-PD mode jumper 16 is setup for pressure-dependent valve operation, the maximum-flow position of the valve closure member 100 is fully open as shown in FIG. 9, such that the flow volume will vary with the differential pressure across the valve. When the PI-PD mode jumper 16 is setup for pressure-independent operation, the maximum-flow position of the valve closure member 100 will vary, as shown in FIG. 10, and is controlled by the pressure-independent mode water valve position controller 13, based on the remote maximum flow signal 4, regardless of the temperature difference between the room temperature sensor 1 and the room setpoint device 2. Maximum flow is maintained in the pressure-independent mode because the flow rate needs to be limited to allow adequate time for the water or water glycol mixture to be in the coil to provide proper heat transfer.

Although aspects of the invention have been described with respect to some preferred embodiments, those skilled in the art will recognize that changes may be made in form and detail without departing from the scope and spirit of the invention. For example, HVAC control valves can have linear motion valve closure member travel, such as with a globe valve or gate valve, or can have angular rotation valve closure member travel, such as with a ball valve, butterfly valve, or shoe valve. Embodiments of the invention may include, but is not limited to, any of the aforementioned valve types, including the linear valve closure member movement valve 18.

In the embodiment of FIGS. 5A and 5B, the valve and actuator assembly 37 includes a valve flow rate sensor 19, an inlet valve pressure sensor 20, an outlet valve pressure sensor 21, a valve closure member position sensor 23, an anti-cavitation control module 26, and an energy consumption calculation and retention module 24. The valve and actuator assembly 37 is suitable for use with a variety of flow rate sensors 19 and a variety of pressure sensing technologies. These include, but are not limited to: 1) differential pressure; 2) positive displacement; 3) velocity; and 4) mass flow.

The operation of differential pressure sensors is based on the premise that the pressure drop across the valve is proportional to the square of the flow rate. Typically, the flow rate is obtained by measuring the pressure differential and extracting the square root. This requires a primary element to cause a kinetic energy change (e.g., constriction in the line to create a difference in upstream and downstream pressures), and a secondary element to measure the differential pressure. Available differential pressure sensors include, for example, orifice plate sensors, venturi tube sensors, flow tube sensors, flow nozzle sensors, pitot tube sensors, elbow tap sensors, target, variable-area sensors (rotameter), annubar sensors, and v-cone sensors.

Positive displacement sensors divide the liquid into specific discrete increments and move it on. The total flow is an accumulation of the measured increments and is usually a series of counts that are tallied over a period of time and stored into a register. Available positive displacement sensors include reciprocating piston, oval gear, nutating disk, rotary vane, and helix.

Velocity sensors operate linearly with respect to the volume flow rate, and are available using several different technologies including turbine sensors, vortex shedding sensors, swirl sensors, conada effect & momentum sensors, exchange sensors, electromagnetic sensors, ultrasonic sensors, Doppler sensors, and transit-time sensors.

Mass sensors measure the mass rate of the flow directly as opposed to the volumetric flow with various designs available including calorimetric (thermal dispersion) sensors, coriolis sensors, and thermal sensors.

In certain embodiments of the invention, the valve and actuator assembly 37 is configured to operate in a stand-alone non-communicating mode with total localized control, while in alternate embodiments, the valve and actuator assembly 37 is configured to operate in a communicating network that allows information to be sent and received by the valve and actuator assembly 37 in order to synchronize its operation with the building management system (BMS) and with other HVAC equipment (e.g., heating, cooling, pumping systems) in the building to provide diagnostic and energy data for remote monitoring, alarming, and data retention.

Referring again to FIGS. 5A and 5B, the remote communications control input signals 7 receive relevant valve and HVAC coil system data from the building management system (BMS) via a serial communication bus including the heat cool mode signal 3, remote maximum flow signal 4, and remote minimum flow signal 5. These signals allow the valve and actuator assembly 37 to be synchronized with the BMS and the building's mechanical heating, cooling, and pumping systems to increase energy efficiency of the building's HVAC system. These signals are retentively stored in the remote communications control input signals 7 such that the operation of the valve actuator assembly 37 can be adapted for the HVAC mechanical piping system in a stand-alone mode or in a communicating network mode. The retentively stored signals also allow for proper operation in a communicating network mode if for any reason communications to the BMS network are lost.

Figure 6:
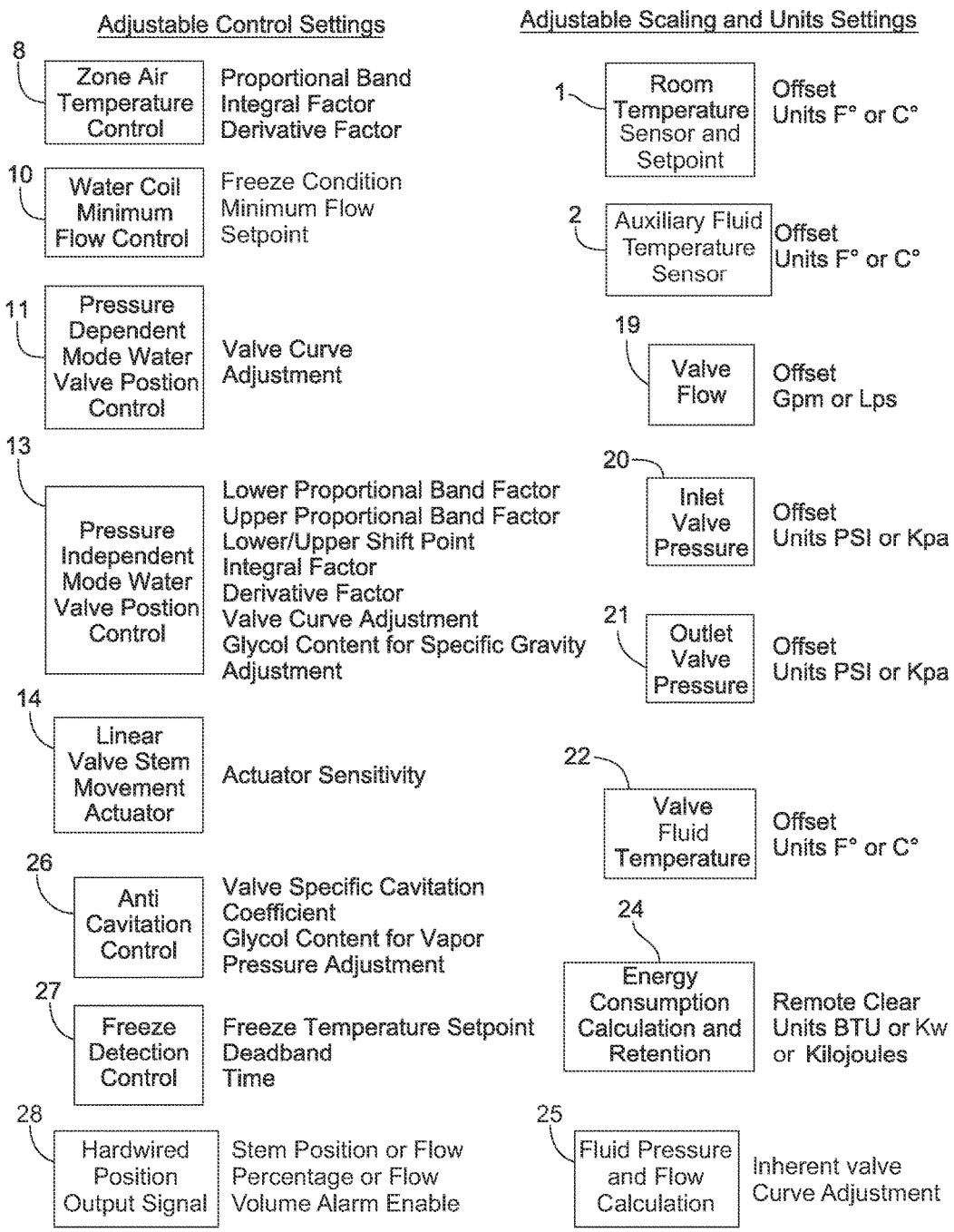
FIG. 6 is a block diagram illustrating adjustable setting for the integral valve and actuator assembly, according to an embodiment of the invention.

For stand-alone operation, the remote communications control input signal 7 values can be edited with a software programming tool that is initially used to establish the valve and actuator assembly 37 settings, but is not required to be left with the valve and actuator assembly 37. The software programming tool is also used to initially adjust operating parameters that are used for the valve and actuator assembly 37 basic operation, as shown in FIG. 6, for both the stand-alone and network communication modes. The adjustable operating parameters, shown in FIG. 6, have default settings that are preset to values that provide stable control for typical HVAC water systems, such that the valve and actuator assembly 37 will work reasonably well with all systems without adjustment. The optional adjustments will allow users to customize behavior of the valve and actuator assembly 37 to better work with the building management system if it is desired to further optimize the valve and actuator assembly 37 to match the unique HVAC conditions of the building.

Some of the adjustable operating parameters, shown in FIG. 6, are for the optional calibration of input sensors by means of changing an offset value, with a default setting of zero, to a positive or negative number to negate any error, if it is determined by an optional independent test measurement that an input sensor does not match another calibrated measurement. Other adjustable operating parameters, shown in FIG. 6, include selection of units for operation in different countries, and for the selection of different units for temperature, pressure, flow, and energy calculated values.

The pressure-dependent mode water valve position controller 11 receives inputs from the fluid pressure and flow calculation module 25 which provides the volume of fluid flowing through the valve, from the water coil minimum flow control module 10, which specifies the minimum water flow that is required during a potential freeze condition, from the zone air temperature controller 8 to provide an output control signal, and from the anti-cavitation control module 26, which indicates when inlet and outlet pressures are such that a cavitation condition can occur. The zone air temperature controller 8 compares the room temperature and setpoint values originating from the room temperature sensor and setpoint 1 values received from the local hardwired control input signal 6, and determines if the valve 18 needs to proportionally open or close to maintain the desired room temperature. The pressure-dependent mode water valve position controller 11 uses a linear input signal to output command relationship that retains the inherent linear valve closure member movement valve 18 water flow curve, unless an alternate curve adjustment has been optionally setup.

The proper direction of opening and closing the valve is determined by the heat cool mode signal 3. The proper direction of opening and closing the valve 18 will vary depending if the valve water source is providing hot water which will require that the valve 18 open to warm up the room or cold water which will require that the valve 18 close to warm up the room. The heat cool mode signal 3 has a local non-volatile mode selection, which can be fixed to define the direction of opening or closing the valve 18 if it is always operated with hot or cold water, or it can be overridden by the BMS from a remote location, by means of a serial communications bus, if the water temperature changes from hot to cold.

The zone air temperature controller 8 mathematically calculates the difference between the room temperature and setpoint values originating from the room temperature sensor and setpoint 1, and then provides an empirical position for the linear valve stem movement actuator 14 using its adjustable proportional band setting. The empirical position for the linear valve stem movement actuator 14 uses the valve closure member position sensor 23 and room temperature value to verify that the valve closure member is being properly positioned to maintain the setpoint value input into the room temperature sensor and setpoint module 1. The valve closure member position sensor 23 feedback value is used to verify that the valve closure member position is in its commanded position regardless of the internal valve pressures, which will change as the pump curve dynamically shifts along with the position of other valves in the piping system that affect the piping system's pressures.

The room temperature sensor 1 feedback value is used to verify that the calculated linear valve closure member movement valve 18 position will provide the correct amount of heat transfer so that the room temperature sensor 1 will be at the same or very close to the room setpoint value. Because the room heat loss and gain will not always be the same as the heat provided from the HVAC water coil heat transfer, via the linear valve closure member movement valve 18, a varying temperature droop or offset difference will result at times between the room temperature sensor and the room setpoint device values. The temperature droop between the room temperature sensor and room setpoint device can be greatly minimized by the adjustable zone air temperature controller 8 integral setting, which provides a negative or positive adjustment value that is additive to the commanded position of the linear valve stem movement actuator 14. This will further drive the linear valve closure member movement valve 18 to provide more or less heat to eliminate the difference between the room temperature sensor and the room setpoint device values. Also available in the zone air temperature controller 8 is an optional derivative setting to anticipate fast changes to the room temperature to improve the HVAC system response, for example, when there are large load changes on the system.

In a particular embodiment, the pressure-dependent-mode water valve position controller 11 uses the zone air temperature controller 8 as its primary input, and then makes a comparison of its fluid pressure and flow calculation module 25 input and its water coil minimum flow control module 10 input to determine if the water and flow conditions are such that the calculated outputs of the zone air temperature controller 8 need to be overridden to a higher flow level to avoid a freeze condition of the HVAC water coil 64 (shown in FIG. 1) and associated piping system. The actual valve water temperature sensed by fluid temperature sensor 22 is used for freeze determination to avoid the issues that can result from assuming that the nearby air temperatures are the same as the water temperature. For example, an error such as this may cause the system to waste energy by forcing the water flow through the valve 18 to a full-flow condition when it is not required. It could also result in the system failing to sense a freezing water condition due to improper freeze stat mounting or due to air stratification.

The valve fluid temperature sensor 22 may be made from a resistive temperature device (RTD) that is located in the external wall of the linear valve closure member movement valve 18 along with a thermally conductive grease to provide good heat transfer. The resistance of the RTD is measured by connecting it in series with a known reference resistor and applying a current to both resistances. The voltages across the resistances are then measured, and then digitized to represent the water temperature.

When a potential freeze condition is detected by the valve fluid temperature sensor 22, the water coil minimum flow control module 10 and pressure-dependent-mode water valve position controller 11 will override the zone air temperature controller 8 to provide the minimum amount of flow that is required to avoid a freeze condition as established by the remote minimum flow signal 5. In an example of system operation, the minimum flow continues until the water temperature rises at least 10° F. (5.6° C.) above the freeze temperature setpoint for 5 minutes or longer with the temperature differential, time period, and freeze temperature setpoint settings being field-adjustable by means of the freeze detection control module 27. In another example, the freeze protection is of the automatic reset type, and will revert back to zone air temperature control 8 after the temperature differential and time period requirements have been fulfilled.

Embodiments of the invention overcome a limitation of the traditional hard-wired automatic reset freeze stats of not alerting the building personnel that there may be a problem with the outdoor air ventilation controller, outdoor air ventilation actuator, or outdoor air ventilation damper, and also avoids a limitation of conventional hard-wired manual reset freeze stats in which normal control is disabled until the manual reset freeze stat is manually accessed and reset.

The anti-cavitation control module 26 uses the inlet valve pressure sensor 20, outlet valve pressure sensor 21, valve fluid temperature sensor 22, and the valve-specific cavitation coefficient to determine whether a cavitation condition exists, or to predict whether cavitation will occur. Since the water temperature affects the cavitation zone, which is also dependent on the valve's maximum allowable pressure differential, the anti-cavitation control module 26 uses the water temperature to calculate the fluid vapor pressure, which is used with the inlet valve pressure sensor 20, and with the outlet valve pressure sensor 21 to predict the point of incipient cavitation.

The valve-specific cavitation coefficient is unique to each valve, and is based on the ratio of the external inlet to external outlet pressure differential to the internal inlet to the minimum pressure in the valve pressure differential. Generally, the valve-specific cavitation coefficient is laboratory-confirmed by means of noise testing, as cavitation in a valve is usually a gradual process starting with only small portions of the valve closure member experiencing vapor bubbles along with the consequential noise. The glycol content is used for a vapor pressure adjustment, as the vapor pressure varies with the water glycol mix as well as with the water temperature. Upon calculation of a possible cavitation condition by the anti-cavitation control module 26, the pressure-dependent-mode water valve position controller 11 overrides the zone air temperature controller 8 to reduce the valve's 18 differential pressure drop until it is out of the cavitation zone.

The maximum permissible pressure drop across the valve which is not to be exceeded to avoid cavitation is determined by the following calculations:

$$\Delta P = VSCC\ (P1 - Pv)$$

$\Delta P$=Pressure drop of incipient cavitation
VSCC=Valve Specific Cavitation Coefficient
P1=Valve Inlet Pressure (psia)
Pv=Vapor pressure of Water Mixture at Flowing Water Temperature (psia)
Psia=psig+14.7

The Pv is calculated by the anti-cavitation control module 26 look up table referencing the water mix glycol content and the water mix temperature.

In certain embodiments, the valve closure member position sensor 23 is used for remote indication and verification that the actual flow matches the commanded position. The hardwired position output signal 28 and the remote communications control output signal 29 receive signals from the valve closure member position sensor 23 and water pressure and flow calculation module 25, and provide the true valve flow as a percentage of the total flow. In other embodiments the hardwired position output signal 28 receive signals from the valve closure member position sensor 23 and water pressure and flow calculation module 25, and provide the position relative to stem location. In yet other embodiments the hardwired position output signal 28 receive signals from the valve closure member position sensor 23 and water pressure and flow calculation module 25, and provide the true valve flow in units of volume. The hardwired position output signal 28 provides a direct current output voltage signal, and the position output signal 30 provides a serial data communications numerical value output signal to the BMS that it receives from remote communications control output signal 29. In other embodiments the hardwired position output signal 28 will indicate alarms with particular voltages corresponding to diagnostics in accordance to the diagnostic information module 34.

In embodiments of the invention, the hardwired position output signal 28 and the position output signal 30 overcome the inherent issues present in conventional control valves of estimating the water flow position from the valve actuator position. This conventional method introduces an error because the actuator position only indicates the valve closure member position and not the flow percentage, because the valve 18 water flow is not always linear relative to its position, and because there is a mechanical linkage between conventional valve actuators and valves that can introduce an error from backlash, movement hysteresis, or malfunction.

For both pressure-dependent and pressure-independent operation, the remote communications control output signal 29 receives relevant valve 18 and HVAC coil system data values, which may be transmitted to the BMS via the serial data communications bus. In some embodiments, this data may include the fluid flow information calculated by the water pressure and flow calculation module 25, the fluid temperature values provided by the auxiliary fluid temperature sensor 2 and the valve fluid temperature sensor 22, energy information as calculated by the energy consumption calculation and retention module 24, diagnostics information received from the actuator stroke and force status module 17, diagnostic reports from the anti-cavitation control module 26, and the freeze control history from the freeze detection control module 27.

When the valve is configured by the PI-PD mode jumper 16 as a pressure independent valve the flow rate sensor technology may be of the differential pressure, positive displacement, velocity, or mass flow types and will be used with the auxiliary fluid temperature sensor 2 and valve fluid temperature sensor 22 to calculate energy in selectable units. When the valve is configured by the PI-PD jumper 16 as a pressure dependent valve the valve's autospan process is used to accurately determine the valve's stem position which has a direct relationship with the flow volume through the valve as shown in FIG. 4 by means of a look up table or polynomial. This calculated flow is available for remote indication purposes and is used with the auxiliary fluid temperature 2 and valve fluid temperature sensor 22 to calculate energy in selectable units.

In a further embodiment, the energy consumption calculation and retention module 24 is integral with the valve actuator 14, and uses the auxiliary fluid temperature sensor 2, valve fluid temperature sensor 22, and flow information from the fluid pressure and flow calculation module 25, whose calculation is based on data from valve flow rate meter 19, inlet valve pressure sensor 20, outlet valve pressure sensor 21, and valve plug position 23, to calculate the heat energy in BTU, Kw, or kilojoules for the International System of Units, along with totalized values for energy consumption tracking By fully integrating the energy consumption calculation and retention module 24 into the electronics of the valve actuator 14, without the need for separately assembled components, it is possible to monitor, track, and retain data on energy usage in a cost-effective manner. The accumulated energy information can be used for M&V in accordance with a good practice M&V protocol to track and document an ECM, and can be cleared out by the BMS so that it can remotely store the information for permanent retention. The remote communications control output signal 29 provides the position output signal 30, flow information 31, temperature information 32, and energy information 33 to the serial communications bus for remote energy reporting and retention.

In a particular embodiment, a diagnostics information module 34 provides diagnostics information received from the actuator stroke and force status module 17, including a determination as to whether the valve stroke length has changed due to debris in the valve 18 or from a mechanical linkage or valve component malfunction. This is detected by a comparison between the actuator's current operating stroke range and operating force and the initial stroke range and operating force that is retentively stored in the actuator. In an embodiment, the diagnostics information module 34 also provides diagnostic information received from the anti-cavitation control module 26 indication of the presence and duration of a cavitation condition. The freeze information module 35 provides information regarding the number of freeze occurrences and total freeze mode duration, for example, during the last seven days. In further embodiments of the invention, the diagnostics module can also facilitate the retention of data provided by the energy consumption calculation and retention module 24, and related to abnormally high energy usage, for example, or other data related to temperature and pressure data that falls outside of certain predetermined limits.

When the valve and actuator assembly 37 is setup for pressure-independent valve operation through the PI-PD mode jumper 16, the PI-PD mode selection device 15 receives its signal from the pressure-independent-mode water valve position controller 13. In a particular embodiment, the pressure-independent mode water valve position controller 13 uses inputs from the flow reset program 12, the water coil maximum flow controller 9, water coil minimum flow controller 10, and uses water flow information calculated by the water pressure and flow calculation module 25, and the anti-cavitation control module 26.

The flow reset program 12 converts calculated numerical position from the zone air temperature controller 8 for the linear valve stem movement actuator 14 to a calculated position to provide water flow control. As with the pressure independent algorithm, the primary control is water flow control that is determined by the room temperature setpoint. The pressure-independent-mode water valve position controller 13 has an adjustable lower proportional band, upper proportional band, proportional lower/upper shift point, and upper and lower integral and derivative settings to obtain accurate and stable flow control. The two different proportional settings are available to de-sensitize the pressure-independent flow control at higher flow rates along with an adjustable shift point that determines if the upper proportional band, upper integral setting, and upper derivative setting are active, or if the lower proportional band, lower integral setting, and lower derivative setting is active.

The proportional band acts as the gain of the control loop. A small proportional band provides a higher gain or sensitivity, and a large proportional band provides less sensitive control. The lower proportional band setting is in effect at flow rates up to the adjustable shift point of the remote maximum flow signal 4, and the upper proportional band setting is in effect at flow rates above the adjustable shift point of the maximum flow signal 4. As with all the other valve and actuator assembly 37 settings, the lower proportional band, upper proportional band, proportional band lower/upper shift point, and upper and lower integral and derivative settings are preset to values that provide stable control for the typical HVAC water systems. The integral settings provide negative or positive adjustments factors that are additive to the linear valve stem movement actuator 14 commanded position when the controlled flow does not match the flow setpoint calculated by the flow reset program 12. Also available in the pressure-independent mode water valve position controller 13 are optional derivative settings to anticipate fast changes to the room temperature to improve the HVAC system response when there are large load changes. The pressure independent mode water valve position controller 13 uses a linear output command relationship, which retains the linear valve closure member movement valve 18 water flow curve, unless an alternate curve adjustment has been optionally setup.

The pressure-independent-mode water valve position controller 13 has a glycol content setting for specific gravity adjustment, as a glycol-water mixture has a higher specific gravity than pure water. As the specific gravity increases as a result of a higher concentration of glycol in the mixture, the water flow volume will be lower at the same linear valve closure member movement valve 18 position than with pure water. The pressure-independent-mode water valve position controller 13 compensates for the glycol-water mixture by use of the glycol content for specific gravity adjustment.

The zone air temperature controller 8 resets the flow setpoint from a minimum to a maximum flow level. The water coil maximum flow controller 9 defines the maximum flow, which is selected to match the designed maximum flow rate of the HVAC water coil 63 (shown in FIG. 1). The water coil minimum flow controller 10 establishes the minimum flow rate for the pressure-independent flow scaling and also establishes the minimum flow rate for freeze protection. The water coil minimum flow controller 10 operates using the same freeze protection sequence as when the valve and actuator assembly 37 is configured for pressure-dependent operation. The minimum flow rate is synchronized with the building's chillers and boilers to operate them at their most efficient temperature differential.

Centrifugal chillers are designed to have their highest energy efficiency when they are fully loaded and operating at their design inlet to outlet water temperature differential. If the chillers have too low a temperature differential because the chilled water valve water flow is too high (providing a lower than ideal heat transfer) or too low a flow or no flow (causing little or no heat transfer), the chiller will operate inefficiently because the return water temperature is too low. Also one chiller operating inefficiently could require another chiller to be sequenced on requiring additional energy because both chillers are operating inefficiently. Additionally, this inefficient operation increases maintenance costs.

Mechanical heating equipment also does not operate at its designed efficiency if not fully loaded. With a condensing boiler, a higher return temperature can avoid the condensing process where the dew point of the exhaust gases cannot be met. If the boilers have too low a temperature differential because the heating valve flow is too high (providing a lower than ideal heat transfer) or too low a flow or no flow (causing little or no heat transfer), the boiler will operate inefficiently because the return water temperature is too high.

The anti-cavitation control module 26 uses the inlet valve pressure sensor 20, outlet valve pressure sensor 21, valve fluid temperature sensor 22, and the valve-specific cavitation coefficient to determine whether a cavitation condition exists, or to predict whether cavitation will occur. Since the water temperature affects the cavitation zone that is also dependent on the valve's maximum allowable pressure differential, the anti-cavitation control module 26 uses the water temperature to calculate the fluid vapor pressure, which is used with data from the inlet valve pressure sensor 20 and the outlet valve pressure sensor 21 to predict the point of incipient cavitation.

The valve-specific cavitation coefficient is unique to each valve and is based on the ratio of the external inlet to external outlet pressure differential to the internal inlet to minimum pressure in the valve pressure differential. Generally, the valve-specific cavitation coefficient is laboratory confirmed by means of noise testing, as cavitation in a valve is usually a gradual process starting with only small portions of the valve closure member 100 experiencing vapor bubbles along with the consequential noise. The glycol content is used for a vapor pressure adjustment as the vapor pressure varies with the water glycol mix as well as with the water temperature. Upon calculation of a possible cavitation condition by the anti-cavitation control module 26, the pressure-independent mode water valve position controller 13 overrides the flow reset program 12 to reduce the valve's differential pressure drop until it is out of the cavitation zone.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve and actuator assembly comprising:
 a valve configured to control a flow of liquid into a coil or heat exchanger; and
 a valve actuator configured to control opening and closing of the valve via positioning of a valve closure member, and further configured to provide both a maximum flow rate and a minimum flow rate of the liquid through the valve, the valve actuator having an integral energy consumption calculation and retention module configured to calculate heat energy for energy consumption tracking;
 wherein the valve actuator further comprises a diagnostics module configured to provide diagnostic information on operation of the valve and actuator assembly to a remote location.

2. The valve and actuator assembly of claim 1, wherein the energy consumption calculation and retention module calculates heat energy for energy consumption tracking using data from a valve flow rate meter that measures a flow rate of liquid through the valve, from water temperature sensors that measures the temperature of liquid in the valve and across the controlled load, and from valve inlet and outlet pressure sensors that measure the pressure drop across the valve.

3. The valve and actuator assembly of claim 1, wherein the energy consumption calculation and retention module calculates heat energy for energy consumption tracking using data from a valve flow rate meter that measures a flow rate of liquid through the self-actuated pressure-dependent valve, from a valve stem position sensor calibrated to match the stroke of the valve stem and from water temperature sensors that measures the temperature of liquid in the valve and across the controlled load.

4. The valve and actuator assembly of claim 3, wherein the energy consumption calculation and retention module is coupled to a communications module such that data from the energy consumption calculation and retention module can be accessed and retentively stored both locally and remotely.

5. The valve and actuator assembly of claim 1, wherein the valve actuator has a communications module configured to facilitate communication with the valve actuator over a network in conformance with the seven-layered Open System Interconnection (OSI) conceptual model (ISO/IEC 7498-1), and further configured to allow both remote monitoring of the flow through the valve, and remote control of the valve actuator.

6. The valve and actuator assembly of claim 5, wherein the network comprises a primary controller LAN and a secondary controller LAN, the primary controller LAN operating at a higher speed than the secondary controller LAN.

7. The valve and actuator assembly of claim 6, wherein the primary controller LAN and the secondary controller LAN are each configured to connect a building controller to an application specific controller.

8. The valve and actuator assembly of claim 5, wherein the communications module is configured to communicate over a network protocol that includes any one of BACnet, LonTalk, KNX, Modbus, M-Bus, ZigBee, Wi-Fi, and EnOcean.

9. The valve and actuator assembly of claim 1, wherein the valve actuator has a plurality of adjustable operating parameters.

10. The valve and actuator assembly of claim 9, wherein the plurality of adjustable operating parameters can be adjusted either locally or remotely.

11. The valve and actuator assembly of claim 9, wherein the plurality of adjustable operating parameters comprises an offset for one of a room temperature sensor, a valve flow meter, a valve water temperature sensor, a valve inlet pressure sensor, and a valve outlet pressure sensor.

12. The valve and actuator assembly of claim 9, wherein at least one of the plurality of adjustable operating parameters is for an optional calibration of input sensors in which a default setting of the at least one of the plurality of adjustable operating parameters is adjusted in order to negate an error in an input sensor value.

13. The valve and actuator assembly of claim 1, wherein the valve actuator is configured to produce a minimum flow through the valve to prevent freezing of the liquid in the coil or heat exchanger, and wherein data from the energy consumption calculation and retention module is used to operate the valve actuator such that any chillers and boilers coupled to the valve and actuator assembly operate at their most efficient temperature differential.

14. The valve and actuator assembly of claim 1, wherein the diagnostics module provides diagnostic information regarding energy consumption data provided by the energy consumption calculation and retention module.

15. The valve and actuator assembly of claim 1, wherein the valve actuator is configured to retentively store the diagnostics information.

16. The valve and actuator assembly of claim 1, wherein the valve actuator comprises:
a motor and geartrain coupled to the throttling valve closure member by a linkage assembly; and
a circuit board having control circuitry to regulate operation of the motor and geartrain, and communications circuitry to enable the actuator to communicate with a building management system via a serial communications bus.

17. The valve and actuator assembly of claim 1, wherein the valve actuator is configured to operate a mechanical self-actuated pressure-independent valve body in a pressure-independent mode.

18. The valve and actuator assembly of claim 1, wherein the valve actuator is configured to operate a mechanical pressure-dependent valve body in a pressure-dependent mode.

19. The valve and actuator assembly of claim 1, wherein the valve actuator is configured to operate a mechanical pressure-dependent valve body in a pressure-independent mode.

20. The valve and actuator assembly of claim 1, wherein the valve and actuator assembly includes a localized controller such that the valve and actuator assembly is a stand-alone unit.

21. The valve and actuator assembly of claim 1, wherein a position feedback signal from the actuator can either be fixed to a particular actuator travel distance typically corresponding to the actuator's full travel, or it can determine a valve stem's travel distance and scale its input signal and position output signal to track the valve's closure member movement range.

* * * * *